United States Patent
Kewitsch et al.

(10) Patent No.: US 6,289,699 B1
(45) Date of Patent: Sep. 18, 2001

(54) WAVELENGTH SELECTIVE OPTICAL COUPLERS

(75) Inventors: Anthony S. Kewitsch, Hacienda Heights; George A. Rakuljic, Santa Monica; Amnon Yariv, San Marino, all of CA (US)

(73) Assignee: Arroyo Optics, Inc., Santa Monica, CA (US)

(*) Notice: Subject to any disclaimer, the term of this patent is extended or adjusted under 35 U.S.C. 154(b) by 0 days.

(21) Appl. No.: 09/035,919

(22) Filed: Mar. 6, 1998

Related U.S. Application Data

(62) Division of application No. 08/703,357, filed on Aug. 26, 1996, now Pat. No. 5,805,751.
(60) Provisional application No. 60/002,916, filed on Aug. 29, 1995.

(51) Int. Cl.[7] .............................. C03B 37/15; G02B 6/255
(52) U.S. Cl. .............................. 65/406; 65/378; 65/399; 65/400; 65/408; 65/411; 65/425; 65/435; 264/1.25; 264/1.26; 385/9; 385/37; 385/50; 385/141; 385/144
(58) Field of Search .............................. 65/378, 399, 400, 65/406, 408, 411, 425, 435; 264/1.25, 1.26; 385/37, 50, 9, 141, 144

(56) References Cited

U.S. PATENT DOCUMENTS

| | | |
|---|---|---|
| 4,474,427 | 10/1984 | Hill et al. . |
| 4,725,110 | 2/1988 | Glenn et al. . |
| 4,737,007 * | 4/1988 | Alferness et al. . |
| 4,737,607 | 4/1988 | Bernard et al. . |
| 4,807,950 | 2/1989 | Glenn et al. . |
| 4,900,119 | 2/1990 | Hill et al. . |
| 5,007,705 | 4/1991 | Morey et al. . |
| 5,016,967 | 5/1991 | Meltz et al. . |
| 5,104,209 | 4/1992 | Hill et al. . |
| 5,107,360 | 4/1992 | Huber . |
| 5,157,747 | 10/1992 | Aktins et al. . |
| 5,171,345 * | 12/1992 | Takemura ........................ 65/411 |
| 5,176,730 * | 1/1993 | Suganuma et al. . |
| 5,187,760 | 2/1993 | Huber . |
| 5,216,739 | 6/1993 | Hill et al. . |
| 5,218,655 | 6/1993 | Mizrahi . |
| 5,235,659 | 8/1993 | Atkins et al. . |
| 5,271,024 | 12/1993 | Huber . |

(List continued on next page.)

FOREIGN PATENT DOCUMENTS

WO 89/12243 12/1989 (WO) .
WO 95/14946 6/1995 (WO) .

OTHER PUBLICATIONS

Prohaska, J.D. et al. "Magnification of Mask Fabricated Fibre Bragg Gratings", Electronics Letters, vol. 29, No. 18, Sep. 1993.*

(List continued on next page.)

Primary Examiner—James Derrington
Assistant Examiner—Michael P. Colaianni
(74) Attorney, Agent, or Firm—Jones, Tullar & Cooper, P.C.

(57) ABSTRACT

A wavelength selective optical fiber coupler having various applications in the field of optical communications is disclosed. The coupler is composed of dissimilar waveguides in close proximity. A light induced, permanent index of refraction grating is recorded in the coupler waist The grating filters and transfers energy within a particular range of wavelengths from a first waveguide to a second waveguide. Transversely asymmetric gratings provide an efficient means of energy transfer. The coupler can be used to combine or multiplex a plurality of lasers operating at slightly different wavelengths into a single fiber. Other embodiments such as a dispersion compensator and gain flattening filter are disclosed.

10 Claims, 20 Drawing Sheets

U.S. PATENT DOCUMENTS

| | | |
|---|---|---|
| 5,287,427 * | 2/1994 | Atkins et al. . |
| 5,309,260 | 5/1994 | Mizrahi et al. . |
| 5,327,515 | 7/1994 | Anderson et al. . |
| 5,337,382 | 8/1994 | Mizrahi . |
| 5,351,321 | 9/1994 | Snitzer et al. . |
| 5,363,239 | 11/1994 | Mizrahi et al. . |
| 5,367,588 | 11/1994 | Hill et al. . |
| 5,377,288 | 12/1994 | Kashyap et al. . |
| 5,400,166 | 3/1995 | Huber . |
| 5,416,866 | 5/1995 | Sehlen . |
| 5,420,948 | 5/1995 | Byron . |
| 5,425,116 | 6/1995 | Dragone et al. . |
| 5,444,803 | 8/1995 | Kim et al. . |
| 5,450,511 | 9/1995 | Dragone . |
| 5,457,758 * | 10/1995 | Snitzer . |
| 5,459,801 | 10/1995 | Snitzer . |
| 5,495,548 | 2/1996 | Bilodeau et al. . |
| 5,506,925 | 4/1996 | Greene et al. . |
| 5,517,589 | 5/1996 | Takeuchi . |
| 5,581,642 | 12/1996 | Deacon et al. . |
| 5,633,965 | 5/1997 | Bricheno et al. . |
| 5,652,819 * | 7/1997 | Orazi . |

OTHER PUBLICATIONS

"All–Fibre Narrowband Reflection Gratings at 1500 nm", Elect. Letters, vol. 26, No. 11, May 24, 1990, pp. 730–732.

C.M. Ragdale, et al., "Integrated Three Channel Laser and Optical Multiplexer for Narrowband Wavelength Division Multiplexing", Elect. Ltrs., vol. 30, No. 11, May 26, 1994, pp. 897–898.

P.E. Dyer. et al., "High Reflectivity Fibre Gratings Produced by Incubated Damage Using a 193 nm ArF Laser", Elect. Ltrs., vo. 30, No. 11, May 26, 1994, pp. 860–862.

V. Mizrahi, et al., "Four Channel Fibre Grating Demultiplexer", Elect. Ltrs., vol. 30, No. 10, May 12, 1994, pp. 780–781.

B. Malo et al., "Point–by–Point Fabrication of Micro–Bragg Gratings in Photosensitive Fibre Using Single Excimer Pulse Refractive Index Modification Techniques", Elect. Ltrs., vol. 29, No. 18, Sep. 2, 1993, pp. 1668–1669.

Francois Ouellette, et al., "Enhancement of Second–Harmonic Generation in Optical Fibers by A Hydrogen and Heat Treatment", Appl. Phys. Lett. 54(12), Mar. 20, 1989, pp. 1086–1088.

P.J. Lemaire, et al., "High Pressure $H_2$ Loading as A Technique for Achieving Ultrahigh UV Photosensitivity and Thermal Sensitivity in $GeO_2$ Dodped Optical Fibres", IEE 1993, Apr. 23, 1993, pp. 1191–1193.

R.M. Atkins, et al., "Mechanisms of Enhanced UV Photosensitivity Via Hydrogen Loading in Germanosilicate Glasses", IEE 1993, May 11, 1993.

B. Malo, et al., "Effective Index Drift From Molecular Hydrogen Diffusion in Hydrogen–Loaded Optical Fibres and Its Effect on Bragg Grating Fabrication", Elect. Ltrs., vol. 30, No. 5, Mar. 3, 1994, pp. 442–443.

G.D. Maxwell, et al., "UV Written 13 dB Reflection Filters in Hydrogenated Low Loss Planar Silica Waveguides".

"Efficient Mode Conversion in Telecommunication Fibre Using Externally Written Gratings", Elect. Ltrs. vol. 26, No. 16, Aug. 1990, pp. 1270–1272.

O. Okamoto, et al., "16–Channel Optical Add/Drop Multiplexer Using Silica–Based Arrayed–Waveguide Gratings", IEE 1995, Mar. 1995.

Y. Tachikawa, et al., "32 Wavelength Tunable Arrayed–Waveguide Grating Laser Based on Special Input/Output Arrangement", Elect. Ltrs., vol. 31, No. 19, Sep. 1995, pp. 1665–1666.

L. Dong, et al., "Ultraviolet Absorption i Modified Chemical Vapor Deposition Preforms", J. Opt. Soc. Am. B/vol. 11, No. 10, Oct. 1994, pp. 2106–2111.

D.L. Williams, et al., "Accelerated Lifetime Tests on UV Written IntraCore Gratings in Boron Germania Codoped Silica Fibre", Elect. Ltrs., vol. 31, No. 24, Nov. 1995, pp. 2120–2121.

M.S. Yataki, et al., "All–Fibre Wavelength Filters Using Concatenated Fused–Taper Couplers", Elect. Ltrs., vol. 21, No. 6, Mar. 1985, pp. 248–249.

M.C. Farries, et al., "Very Broad Reflection Bandwidth (44 nm) Chirped Fibre Gratings and Narrow Bandpass Filters Produced by the Use of an Amplitude Mask", Elect. Ltrs., vol. 30, No. 11, May 1994.

Victor Mizrahi, et al., "Optical Properties of Photosensitive Fiber Phase Gratings", J. of Lightwave Tech., vol. 11, No. 11, Oct. 1993, pp. 1513–1517.

Jocelyn Lauzon, et al., "Numerical Analysis of the Optimal Length and Profile of a Linearly Chirped Fiber Bragg Grating for Dispersion Compensation", Optics Ltrs., vol. 20, No. 6, Mar. 1995, pp. 647–649.

Francois Ouellette, "All–Fiber Filter for Efficient Dispersion Compensation", Optics Ltrs., vol. 16, No. 5, Mar. 1991, pp. 303–305.

F. Ouellette, et al., "Broadband and WDM Dispersion Compensation Using Chirped Sampled Fibre Bragg Gratings", Elect. Ltrs., vol. 31, No. 11, May 1995, pp. 899–901.

Philip St. J. Russell, et al., "Fibre Gratings", Physics World, Oct. 1993.

D.L. Williams, et al., "Enhanced UV Photosensitivity in BoronCodoped Germanosilicate Fibres", Elect. Ltrs., vol. 29, No. 1, Jan. 1993, pp. 45–47.

R. Kashyap, et al., "Measurement of Ultra–Steep Edge, High Rejection Fibre Bragg Grating Filters", Elect. Ltrs., vol. 31, No. 15, pp. 1282–1283.

Vikram Bhatia, "Optical Fiber Long–Period Grating Sensors" Optics Ltrs., vol. 21, No. 9, May 1996, pp. 692–694.

Richard L. Laming, et al., "Fibre Bragg Gratings; Application to Lasers and Amplifiers", Optoelect. Res. Ctr.

L. Dong, et al., "Single Pulse Bragg Gratings Written During Fibre Drawings", Elect. Ltrs., vol. 29, No. 17, Aug. 1993, pp. 1577–1578.

J.L. Archambaualt, et al., "High Reflectivity and Narrow Bandwidth Fibre Gratings Written by Single Excimer Pulse".

F. Bilodeau, et al., "An All–Fiber Dense–Wavelength–Division Multiplexer/Demultiplexer Using Photoimprinted Bragg Gratings", IEEE Photo. Tech. Ltrs., vol. 7, No. 4, Apr. 1995, pp. 388–390.

F. Bilodeau, et al., "Photosensitization of Optical Fiber and Silica–on–Silicon/Silica Waveguides", Optics Ltrs., vol. 18, No. 12, Jun. 1993, pp. 953–955.

paul J. Lemaire, "Reliability of Optical Fibers Exposed to Hydrogen: Prediction of Long–Term Loss Increases", Optic Eng., vol. 30, No. 6, Jun. 1991, pp. 780–789.

James F.f Shackelford, et al., "Solubility of Gases i Glass. II. He, Ne, and $H_s$ in Fused Silica", Appl. Phys., vol. 43, No. 4, Apr. 1972, pp. 1619–1626.

L. Dong, et al., "Enhanced Photosensitivity in Tin–Codoped Germanosilicate Optical Fibers", IEEE Photo. Tech. Ltrs., vol. 7, No. 9, Sep. 1995, pp. 1048–1050.

K.O. Hill, et al., "Photosensitivity in Optical Fibers", Ann. Rev. Mater Sci. 1993, 125–157.

K.P. Jones, et al., "Optical Wavelength Add–Drop Multiplexer in Installed Submarine WDM Network", Elect. Ltrs., vol. 31, No. 24, Nov. 1995, pp. 2117–2118.

T.A. Birks, et al., "2 x 2 Single–Mode Fiber Routing Switch", Optics Ltrs., vol. 21, No. 10, May 1996, pp. 722–724.

T.A. Birks, et al., "Low Power Acousto–Optic Device Based on a Tapered Single–Mode Fiber", IEEE Photo. Tech. Ltrs., vol. 6, No. 6, Jun. 1994, pp. 725–727.

D.O. Culverhouse, et al., "Four Port Fused Taper Acousto–Optic Devices Using Standard Singlemode Telecommunications Fibre", Elect. Ltrs., vol. 31, No. 15, Jul. 1995, pp. 1279–1280.

T.A. Birks, et al., "Four–Port Fiber Frequency Shifter With a Null Taper Coupler", Optics Ltrs., vol. 19, No. 23, Dec. 1994, pp. 1964–1966.

T.A. Birks, et al., "All–Fiber Polarizer Based on a Null Taper Coupler", Optics Ltrs., vol. 20, No. 12, Jun. 1995, pp. 1371–1373.

H. Bissessur, et al., "16 Channel Phased Array Wavelength Demultiplexer on InP With Low Polarization Sensitivity", IEEE 1994, Dec. 1993.

M.S. Whalen, et al., "In–Line Optical–Fibre Filter For Wavelength Multiplexing", Elect. Ltrs., vol. 21, No. 17, Aug. 1985, pp. 724–725.

Y. Inoue, et al., "Silica–Based Arrayed–Waveguide Grating Circuit as Optical Splitter/Router", IEEE, Mar. 1995.

Hiroshi Yasaka, et al., "Multiwavelength Light Source With Precise Frequency Spacing Using Mode–Locked Semiconductor Laser and Arrayed Waveguide Grating Filter", OFC '96 Tech. Digest, pp. 299–300.

Z.M. Chuang, et al., "Enhanced Wavelength Tuning in Grating–Assisted Codirectional Coupler Filter", IEEE Photo. Tech. Ltrs., vol. 5, No. 10, Oct. 1993, p. 1219–1221.

* cited by examiner

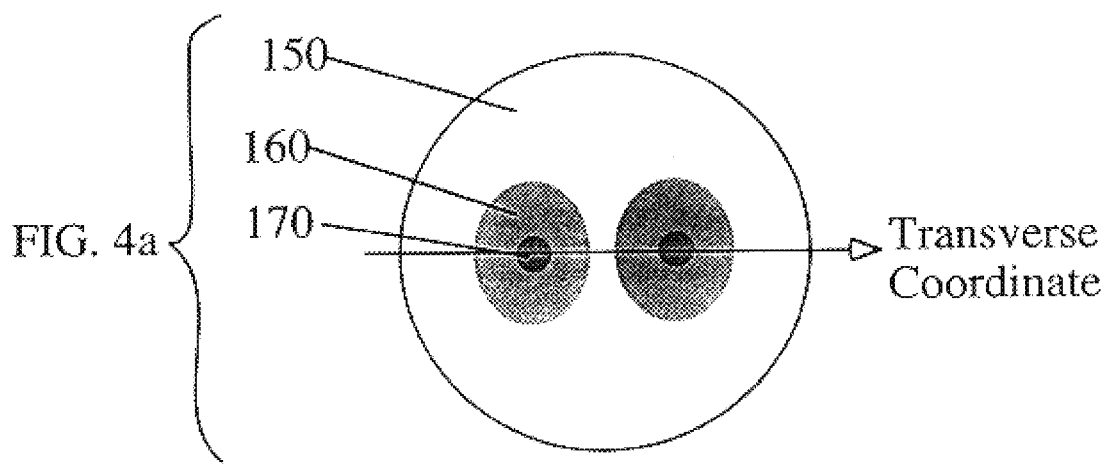
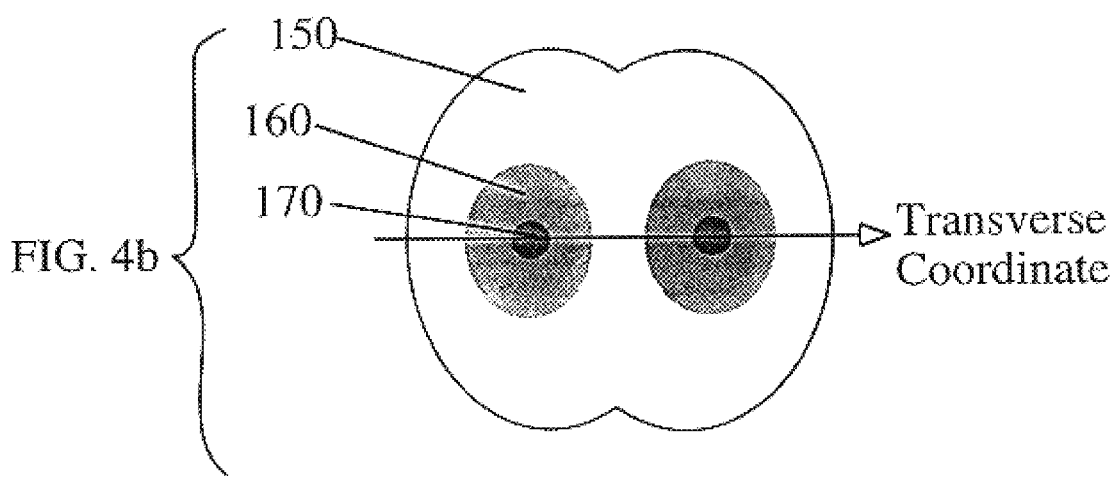

WAVELENGTH SELECTIVE OPTICAL COUPLERS

This application is a division of application Ser. No. 08/703,357, filed Aug. 26, 1996, now U.S. Pat. No. 5,805,751, issued Sep. 8, 1998, and claims the benefit under 35 USC 119(e) of U.S. Provisional Application Ser. No. 60/002,916, filed Aug. 29, 1995.

FIELD OF THE INVENTION

The present invention relates to the communication of signals via optical fibers, and particularly to an optical fiber coupler and methods for making the same. More particularly, the invention relates to a wavelength selective optical coupler and other devices using a refractive index grating in a coupling region.

DESCRIPTION OF RELATED ART

Low loss, wavelength selective couplers are important components for optical fiber communication networks based on wavelength division multiplexing (WDM). WDM enables an individual optical fiber to transmit several channels simultaneously, the channels being distinguished by their center wavelengths. An objective is to provide a precise wavelength selective coupler that is readily manufactured and possesses high efficiency and low loss. One technology to fabricate wavelength selective elements is based on recording an index of refraction grating in the core of an optical fiber. See, for instance, Hill et al., U.S. Pat. No. 4,474,427 (1984) and Glenn et al., U.S. Pat. No. 4,725,110 (1988). The currently preferred method of recording an in-line grating in optical fiber is to subject a photosensitive core to the interference pattern between two beams of actinic (typically UV) radiation passing through the photoinsensitive cladding.

Various techniques such as flame brushing and hydrogen loading have been introduced to increase fiber photosensitivity and produce index of refraction changes in excess of $10^{-2}$, as described by Ouellette et al., Applied Physics Letters, Vol. 54, p. 1087 (1989), and Applied Physics Letters, Vol. 58, p. 1813 (1991) and Atkins et al., U.S. Pat. No. 5,287,427. Alternately, J.-L. Archambault et al., Electronics Letters, Vol. 29, p. 453 (1993) reported that an index change as large as 0.006 was obtained in untreated optical fiber (15 mol % Ge core) using a single high energy (40 mJ) pulse at 248 nm.

A method of recording Bragg gratings in single mode optical fibers by UV exposure through a phase mask was reported by Anderson et al., U.S. Pat. No. 5,327,515 (1994), Snitzer et al., U.S. Pat. No. 5,351,321 (1994), Hill et al., U.S. Pat. No. 5,367,588 (1994). This phase mask is typically a transparent substrate with periodic variations in thickness or index of refraction that is illuminated by an optical beam to produce a spatially modulated light pattern of the desired periodicity behind the mask.

Optical fiber gratings reported in the prior art almost universally operate in the reflection mode. Because of the small numerical aperture of single mode optical fibers (N.A.~0.11), grating components transverse to the longitudinal axis of the optical fiber couple light into the lossy cladding modes. The maximum allowable angular offset of the grating fringes with the longitudinal axis is generally less than 1 degree. Furthermore, to gain access to this reflected mode in a power efficient manner is difficult, because the wave is reflected backwards within the same fiber. A first method to access this reflected light is to insert a 3 dB coupler before the grating, which introduces a net 6 dB loss on the backwards reflected and outcoupled light. A second method is to insert an optical circulator before the grating to redirect the backwards propagating mode into another fiber. This circulator introduces an insertion loss of 1 dB or more and involves complicated bulk optic components. A method to combine the filtering function of a fiber grating with the splitting function of a coupler in a low loss and elegantly packaged manner would be highly attractive for WDM communication networks.

Another method well known in the prior art uses directional coupling to transfer energy from one waveguide to another by evanescent coupling (D. Marcuse, "Theory of Dielectric Waveguides," Academic Press 1991 and A. Yariv, "Optical Electronics," Saunders College Publishing, 1991). This evanescent coupling arises from the overlap of the exponential tails of the modes of two closely adjacent waveguides, and is the typical mode of operation for directional coupler based devices. In contrast, non-evanescent coupling occurs when the entire optical modes substantially overlap, as is the case when the two waveguides are merged into a single waveguide. Devices that rely on evanescent coupling (e.g., directional couplers) in contrast to non-evanescent coupling have inherently weaker interaction strengths.

One realization of a directional coupling based device uses gratings recorded in a coupler composed of two identical polished fibers placed longitudinally adjacent to one another (J.-L. Archambault et al., Optics Letters, Vol. 19, p.180 (1994)). Since the two waveguides are identical in the coupling region, both waveguides possess the same propagation constant and energy is transferred between them. This results in poor isolation of the optical signals traveling through the two waveguides, because optical power leaks from one fiber to the other. Another device also based on evanescent coupling was patented by E. Snitzer, U.S. Pat. No. 5,459,801 (Oct. 17, 1995). This device consists of two identical single mode fibers whose cores are brought close together by fusing and elongating the fibers. The length of the coupling region should be precisely equal to an even or odd multiple of the mode interaction length for the output light to emerge entirely in one of the two output ports. A precisely positioned Bragg grating is then UV recorded in the cores of the waist region.

An alternative grating assisted directional coupler design reported by R. Alferness et al., U.S. Pat. No. 4,737,007 and M. S. Whalen et al., Electronics Letters, Vol. 22, p. 681 (1986) uses locally dissimilar optical fibers. The resulting asymmetry of the two fibers improves the isolation of the optical signals within the two fibers. However, this device used a reflection grating etched in a thin surface layer on one of the polished fibers, dramatically reducing the coupling strength of the grating. It also is based on evanescent coupling. A serious drawback of this device is that the wavelength for which light is backwards coupled into the adjacent fiber is very close to the wavelength for which light is backreflected within the original fiber (about 1 nm). This leads to undesirable pass-band characteristics that are ill suited for add/drop devices that are designed to add or drop only one wavelength. For optical communications applications in the Er doped fiber amplifier (EDFA) gain window (1520 to 1560 nm), this backreflection should occur at a wavelength outside this window to prevent undesirable crosstalk. The separation between the backreflected and backwards coupled wavelengths is impractically small for the all-fiber, grating assisted directional coupler approaches of the prior art.

Alternatively, F. Bilodeau et al., IEEE Photonics Technology Letters, Vol. 7, p. 388 (1995) fabricated a Mach-Zender interferometer which served as a wavelength selective coupler. This device relies on the precisely controlled phase difference between two interferometer arms and is highly sensitive to environmental fluctuations and manufacturing variations. In addition, a significant fraction of the input signal is backreflected. Therefore, it is uncertain whether this device will be able to meet the demanding reliability requirements for telecommunications components.

The conventional grating assisted directional coupler suffers from both a relatively low coupling strength and small wavelength separation of back-reflected and backwards coupled light These problems arise because the two coupled optical waveguides remain physically separate and the light remains guided primarily in the original cores. The light propagating in each of the two coupled waveguides overlaps only at the evanescent tails of the optical modes, corresponds to evanescent coupling. The two original optical fibers can instead be fused and elongated locally to form a single merged waveguide core of much smaller diameter. The resulting optical mode propagation characteristics are effectively those of a multimode silica core/air cladding waveguide. The two waveguides are merged such that the energy in the original optical modes of the separate waveguides interact in a substantially non-evanescent manner in the merged region. The variations in the index profile of the optical waveguide vary sufficiently slowly in the longitudinal direction such that light entering the adiabatic taper region in a single eigenmode of the waveguide evolves into a single local supermode upon propagating through the adiabatic transition region. The concept of supermodes is described at length in A. Yariv, "Optical Electronics," Saunders College Publishing, 1991. By merging the waveguides into a single wave propagation region, the coupling due to the index of refraction grating can be substantially increased. Furthermore, the conventional grating assisted directional coupler suffers from the small difference in modal propagation constants present in these glass rather than air-clad waveguides. The practical consequence of this is that the separation between the wavelength of the backreflected and backcoupled light is small.

Fused tapered single mode couplers with very low excess loss (<0.05 dB) have been reproducibly fabricated with an automated fused coupler manufacturing station using standard optical fiber for telecommunications. However, the coupling region of conventional fused fiber couplers manufactured by E-Tek Inc. or Gould Inc., for example, is not photosensitive. Conventional single mode optical fibers possess claddings of nominally pure silica, while the cores are doped with Ge, a dopant that imparts a photosensitive response upon relatively low intensity deep UV illumination. Therefore, index of refraction gratings have been recorded only within the core of the optical fiber, a volume of less than 1% of the total fiber. If the diameter of such a fiber is reduced substantially in a taper, for instance, by a factor of 10 as is common in fused couplers, the optical energy extends well outside the original core. For a grating recorded in the substantially reduced diameter fiber, the interaction of the core grating with the optical mode is small. As a consequence, the recording of fiber gratings in standard single mode optical fibers of diminished diameter results in dramatically reduced diffraction efficiency.

GLOSSARY

A "waveguide" herein is an elongated structure comprised of an optical guiding region of relatively high refractive index transparent material (the core) surrounded by a material of lower refractive index (the cladding), the refractive indices being selected for transmitting an optical mode in the longitudinal direction.

An "optical fiber" herein is an elongated structure of nominally circular cross section comprised of a "core" of relatively high refractive index material surrounded by a "cladding" of lower refractive index material, adapted for transmitting an optical mode in the longitudinal direction.

An "air-clad" fiber is one in which the original core is too small to be effective and in which transmission is confined by the reduced original cladding and the surrounding environment (typically air).

A "grating" herein is a region wherein the refractive index varies as a function of distance in the medium. The variation typically, but not necessarily, is such that the distance between adjacent index maxima is constant.

An "apodized" grating exhibits a smoothed rather than strictly rectangular index modulation envelope.

The "bandwidth" of a grating is the wavelength separation between those two points for which the reflectivity of grating is 50% of the peak reflectivity of the grating.

A "coupler" herein is a waveguide composed of two or more fibers placed in close proximity of one another, the proximity being such that the mode fields of the adjacent waveguides overlap to some degree.

A "waist" herein refers to that portion of an elongated structure with minimum circumference.

An "asymmetric coupler" herein is a structure composed of two or more waveguides that are dissimilar in the region longitudinally adjacent to the coupling region.

A "transversely asymmetric" grating is an index of refraction grating in which the index variation as a function of distance firm the central axis of the waveguide along a direction perpendicular to the longitudinal axis is not identical to the index variation in the opposite direction, perpendicular to the longitudinal axis. A transversely asymmetric grating possesses grating vector components at nonzero angles to the longitudinal axis or mode propagation direction of the waveguide. Orthogonal modes are not efficiently coupled by a transversely symmetric grating.

A "supermode" is the optical eigenmode of the complete, composite waveguide structure.

SUMMARY OF THE INVENTION

A narrowband, wavelength selective optical coupler which redirects optical energy of a particular wavelength from one waveguide to another is described. Index of refraction gratings are impressed within the waist of an asymmetric coupler and are arranged, relative to reflected wave energy modes in multi-wavelength inputs, to interact with low loss in redirecting a selected wavelength along a particular path Accordingly, the present invention provides significant advantages in optical communications and sensor systems that require narrow optical bandwidth filters in which light in a particular waveguide at a particular wavelength channel is routed in a low loss manner into another waveguide.

Our invention achieves both optical filtering and splitting more reliably and efficiently by using an asymmetric coupler in which an index of refraction grating is impressed within the coupling region. This device is hereafter referred to as a grating assisted mode coupler. We eliminate undesired leakage of optical energy between waveguides by using dissimilar waveguides. We increase the grating coupling strength by merging or joining the two waveguides together into a single waveguide at the coupler waist. We significantly increase the separation between the backreflected and coupled wavelengths to improve the bandpass characteristics of the device by strongly fusing or merging the adjacent waveguides.

An important feature of the index of refraction grating is that it possesses transverse asymmetry, because it allows optical energy to be transfered between orthogonal or independent optical modes. That is, the index of refraction grating has a unique spatial distribution that enables one optical mode to be coupled to an orthogonal optical mode efficiently.

Index of refraction gratings are impressed within the coupler waist by one of several methods, including actinic illumination, chemical indiffusion, chemical outdiffusion, and chemical etching. One preferred technique to impress index of refraction gratings in fiber couplers is to photosensitize the coupler waist to actinic illumination by appropriate doping and hydrogen treatment. Alternately, chemical methods may be preferred in the manufacture of asymmetric couplers defined by lithography on planar substrates.

The couplers described herein can be fabricated by pre-tapering a single fiber in a central region of approximately 5 mm length under a hydrogen torch, then placing a second untapered fiber longitudinally adjacent to first fiber. These two fibers are elongated under a flame such that the two fibers fuse in a central region of approximately 5 mm length with a fused waist of less than 20 $\mu$m diameter. In this central region, the cladding, rather than the greatly diminished core, is the basic wave propagating element, and the wave field extends into the immediately surrounding environment.

A tapered fiber grating is disclosed in which an index of refraction grating is impressed in the photosensitive waist of an individual tapered fiber.

The grating assisted mode coupler redirects light of a particular wavelength from one waveguide into another with low loss (theoretically 0 dB), high wavelength selectivity and an all-fiber fabrication. These couplers are well suited as frequency selective add/drop filters, WDM demultiplexers/multiplexers, laser frequency stabilizers, fiber optic sensors, and dispersion compensators, to name a few applications. Further objects and advantages of our invention will become apparent by considering the drawings and accompanying detailed description.

BRIEF DESCRIPTION OF THE DRAWINGS

The present invention will be described with reference to the drawings of the following figures:

FIG. 4 shows a cross sectional view of the fused coupler waist;

DETAILED DESCRIPTION OF THE INVENTION

Optical fibers carry signals in the form of modulated light waves from a source of data, the transmitter, to a recipient of data, the receiver. Once light enters this fiber, it travels in isolation unless an optical coupler is inserted at some location along the fiber. Optical couplers allow light signals to be transfered between normally independent fibers.

If multiple signals at different wavelengths travel down the same fiber, it is desirable to transfer a signal at only a predetermined set of wavelengths to or from this fiber into another fiber. These devices are called wavelength selective optical couplers. A desirable attribute of such a wavelength selective optical coupler is that it remains transparent to all wavelengths other than those to be coupled. This transparency is quantified by the insertion loss, crosstalk, and bandwidth. Wavelength selective couplers of the prior art are not adequately transparent for many important applications. The grating assisted mode coupler is a fundamentally transparent device. It transfers light signals from one fiber to another at only a predefined, precise set of wavelengths.

The present invention provides a device for coupling narrowband light between two or more optical fibers by using a grating assisted mode coupler. In accordance with the present invention, light is coupled between two or more locally dissimilar waveguides by an index of refraction grating in the shared coupling region. The present invention also describes methods by which the coupling strength at a particular wavelength is maximized.

Figure 1A:
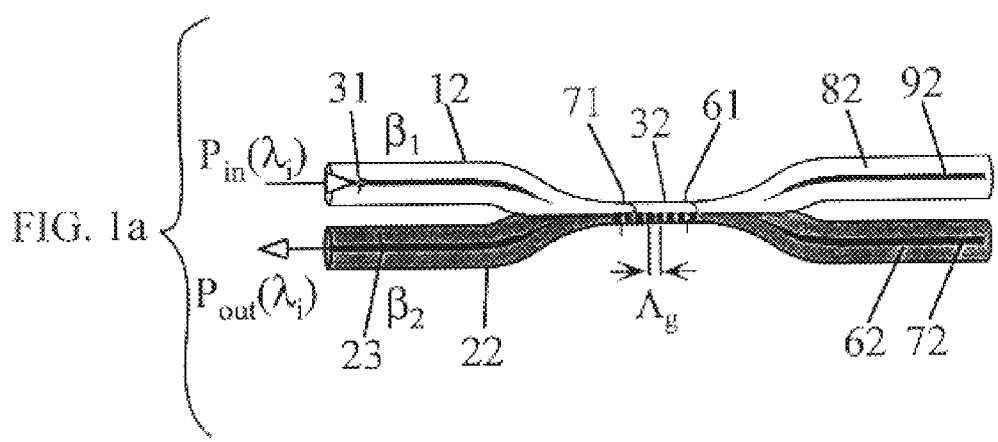
FIG. 1 shows the principle of operation of a grating assisted mode coupler.
Figure 1B:
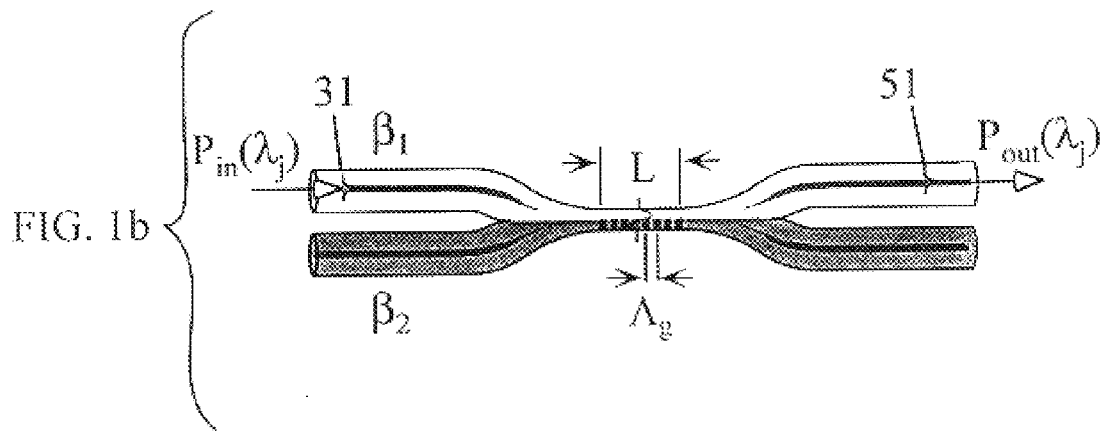

FIG. 1 illustrates the operating principle of this device. The fused coupler consists of a first fiber 12 and a second fiber 22 dissimilar in the vicinity of the coupling region 32 wherein an index of refraction grating has been impressed. The shading variations in FIG. 1 represents the dissimilar doping profiles and indices of refraction of the two fibers. Alternately, the two fibers may be made dissimilar by locally pretapering one of them by 20% in the vicinity of the fused region, without fundamentally changing the operation of the device. If the input mode 31 with propagation vector $\beta_1$ and output mode 23 with propagation vector $\beta_2$ satisfy the Bragg law for reflection from a thick index grating of period $\Lambda_g$ at a particular wavelength, say $\lambda_i$:

$$\beta_1(\lambda_i) - \beta_2(\lambda_i) = 2\pi/\Lambda_g,$$

then the optical energy at $\lambda_i$ in the first fiber 12 is coupled into the backward propagating mode of the second fiber 22. The spectral response and efficiency of this coupling process is dictated by the coupling strength and the interaction length of the optical modes with the grating.

In FIG. 1, the wavelength of the input mode is detuned, say to $\lambda_j$, so that $\beta_1(\lambda_j) - \beta_2(\lambda_j) \neq 2\pi/\Lambda_g$, and the input mode 31 in the first fiber travels through the coupler waist and reappears as the output mode of the first fiber 51, with minimal leakage into the second fiber 22. Therefore, only a particular wavelength $\lambda_i$ is coupled out of the first fiber 12, as determined by the grating period in the coupling region. The amount of wavelength detuning required to reduce the reflective coupling by 50% is given by the full-width-half-maxima (FWHM) bandwidth $\Delta\lambda$ of the grating:

$$\Delta\lambda \approx \frac{\Lambda_g \lambda_o}{L_{eff}},$$

where $L_{eff}$ is the effective interaction length of the optical beam and the grating, which may be less than the physical length L of the grating for large $\kappa$. The bandwidth of reflection gratings is narrower than that of transmission gratings by typically ten to fifty times because the grating period $\Lambda_g$ is much shorter for the former. The narrower frequency response in the reflection mode is desirable for dense WDM applications. Typically, the desired bandpass is approximately 0.5 nm at 1.55 $\mu$m. This dictates that the length of the reflection grating should be approximately 1 mm. A reflectivity in excess of 90% for a grating thickness L of 1 mm requires a $\kappa L$ larger than 2. $\kappa$ should then be 20 cm$^{-1}$. To achieve this coupling strength in the fused coupler, the grating index modulation should be at least $10^{-3}$. This level of index modulation is achieved in silica waveguides and optical fibers by appropriate preparation of the materials and dimensions of the media.

In addition to backward coupling of light into the adjacent waveguide, the grating typically reflects some light back into the original fiber at a different wavelength given by $2\beta_1(\lambda_2) = k_g$. To ensure that $\lambda_2$ is outside the wavelength operating range of interest, the difference between $\beta_1$ and $\beta_2$ is made sufficiently large. The difference increases as the waveguides become more strongly coupled, until the limiting case is reached, for which the waveguide cores are merged into one another. This difference is maximized for small coupler waists, in which $\beta_1$ and $\beta_2$ correspond to the $LP_{01}$ and $LP_{11}$ modes of an air-clad optical waveguide. Furthermore, an appropriate transversely asymmetric grating substantially reduces the coupling strength for back reflection.

To form this fiber optic coupler, two locally dissimilar fibers with propagation vector $\beta_1$ of the first optical mode and propagation vector $\beta_2$ of second optical mode are fused to a narrow waist typically 1 to 50 $\mu$m in diameter, forming a waveguide in the fused region which supports at least two optical modes. The number of supermodes supported by this composite waveguide structure is determined by the index profile and dimensions of the structure. When this composite waveguide structure is significantly reduced in diameter, the waveguiding characteristics resemble that of a glass core/air clad waveguide. The mode propagation behavior of this simple step index waveguide is then characterized by a parameter defined as the V number, which decreases as the radius a of the waveguide core is decreased, and depends on the optical wavelength $\lambda$ of the mode, the core index $n_{core}$ and the cladding index $n_{clad}$:

$$V = \frac{2\pi a}{\lambda}\sqrt{n_{core}^2 - n_{clad}^2} = \frac{2\pi a}{\lambda} N.A..$$

N.A. is defined as the numerical aperture of the waveguide. The first mode is nominally $LP_{01}$ and the second mode is nominally $LP_{11}$. Because the two waveguides are sufficiently dissimilar and the tapered transition region is sufficiently long, the input optical modes adiabatically evolve into the supermodes of the coupling region. Upon exiting the coupling region, the supermodes will evolve adiabatically back into the original optical modes as the waveguide splits into the two original fibers. Thus, the optical energy passes from the input to the output without being disturbed. A typical fiber asymmetry of $(|\beta_1| - |\beta_2|)/(|\beta_1| + |\beta_2|) = 0.0005$ and a taper angle of 0.01 radians results in less than 1% in undesired leakage of optical energy from one fiber to the other. To achieve the asymmetry, two different fibers with different index profiles can be used (as indicated by the shading in FIG. 1). Alternately, a pair of identical fibers can be made dissimilar by stretching (adiabatically pretapering) or etching one fiber in a central region before the coupler is made. The two fibers are merged or joined into one waveguide in the coupling region, yet the two fibers behave as if they were optically independent. Then a grating is impressed in the coupling region to redirect light at a particular wavelength from one fiber to another. For example, a 125 $\mu$m diameter fiber is pretapered by 25%, then elongated and fused to another 125 $\mu$m diameter fiber to form a 3.6 $\mu$m diameter, 1 cm long waist region over a distance of approximately 1 cm. This taper angle is sufficient to produce a low loss, adiabatic taper. For a UV impressed grating period of 0.540 $\mu$m, the wavelength of the drop channel of representative devices is in the 1550 nm range.

A suitable starting fiber with a photosensitive cladding may be manufactured using known fabrication procedures by doping the cladding region at least partially with a photosensitive species while maintaining the waveguiding properties (i.e., the N.A.) of a standard single mode fiber. For instance, by using the inside-the-tube vapor deposition process, a Ge doped cladding (about 3–10 wt %) and a more highly Ge doped core (about 6–13 wt %) can be built up within a thin walled pure silica tube (20 mm i.d., 22 mm o.d.), or a thick walled pure silica tube (20 mm i.d., 25 mm o.d.) which is thinned by etching or grinding following preform collapse. In conventional optical fiber fabrication, the outer pure silica tube comprises the bulk of the optical fiber cladding after sintering, collapsing and drawing, so that only a thin layer of Ge doped silica which defies the core should be deposited. However, to form a photosensitive cladding of substantial thickness, multiple layers of Ge doped silica (>5) are deposited on the inside of the pure silica tube prior to forming the core to construct the photosensitive cladding, since tubes of Ge doped silica are not readily available. This preform precursor can then be used to form photosensitive cladding optical fiber by collapsing and drawing down the resulting preform using conventional fiber fabrication methods.

Alternatively, the photosensitive cladding fiber may be fabricated by outside vapor deposition, in which the Ge doped glass soot is deposited on the outside of a silica rod. Upon sintering and coalescing the soot, the silica rod is bored out (to form effectively a Ge-doped cylindrical tube) and additional Ge doped glass is deposited on the inner wall to define the core of higher index of refraction.

A more recent fabrication technique uses angled soot deposition to generate a core, followed by an initial perpendicular soot deposition to define a first preform that is consolidated by sintering. Then more cladding soot may be deposited in one or more deposition/sintering sequences, until the desired final dimensions are reached. With this approach the amount of dopant can be controlled without modifying the soot core/cladding deposition process.

Figure 2A:
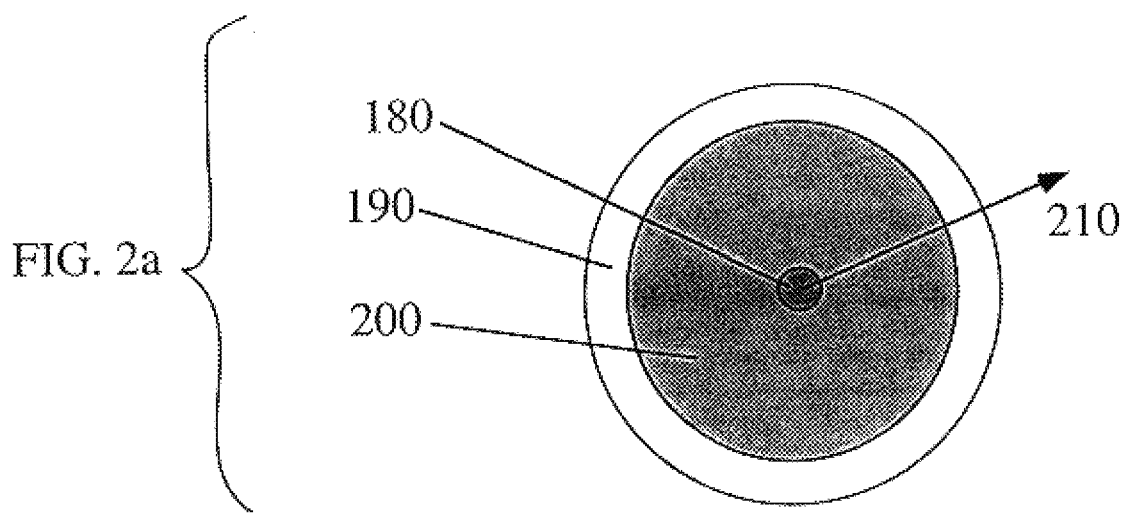
FIG. 2 shows a cross sectional view of photosensitive cladding optical fibers.
Figure 2B:
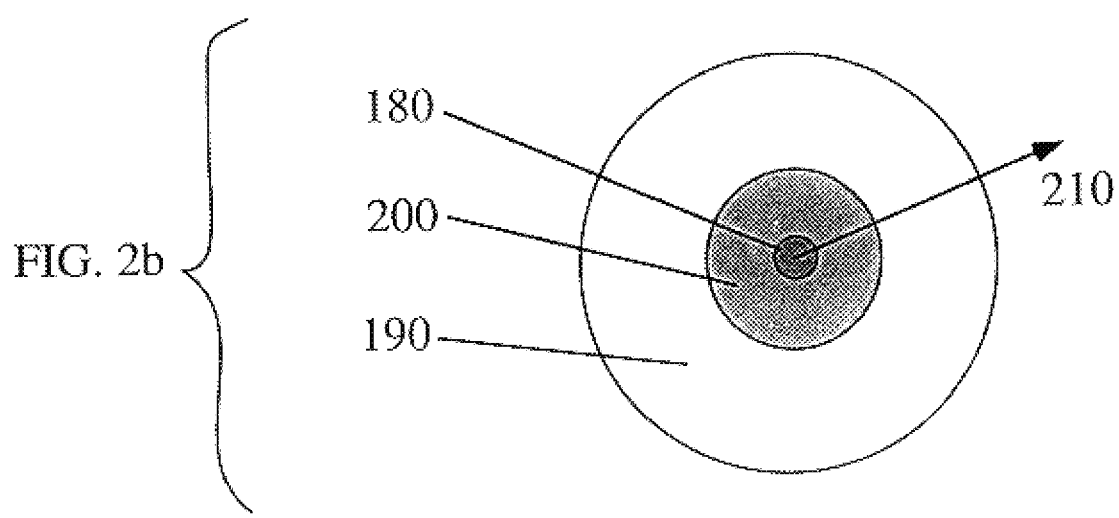
Figure 3:
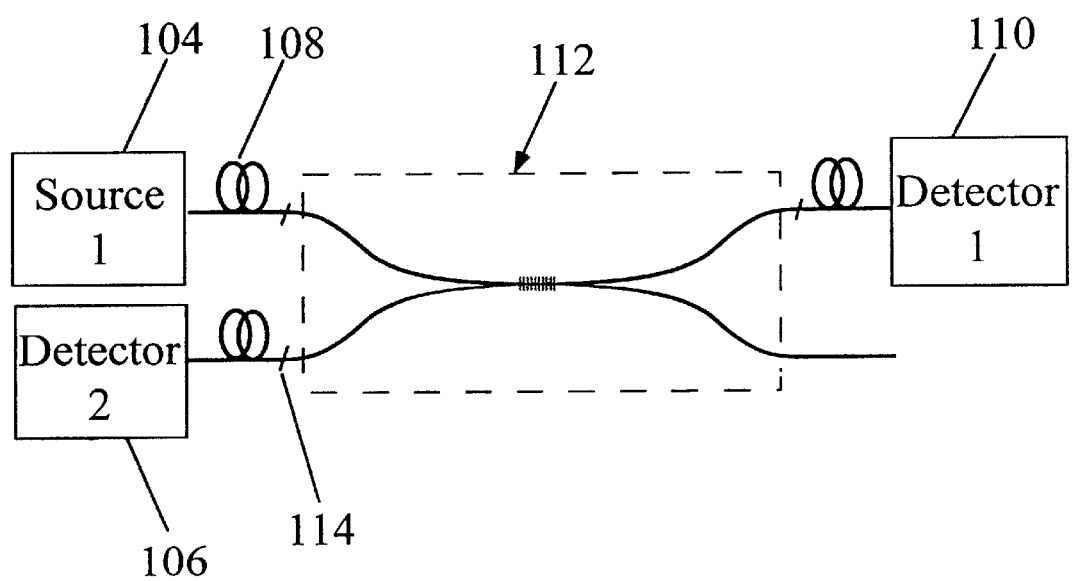
FIG. 3 shows a functional diagram of a grating assisted mode coupler.

The goal of any of these deposition processes for use in the present invention is to dope a significant volume fraction of the cladding (FIG. 2). The farther the dopant 200 (e.g., Ge) extends out along the radius of the fiber 210, the more photosensitive the resulting-coupler waist will be after the fusion and elongation stages. Some typical cross sections of suitable photosensitive cladding fibers with different doping profiles are illustrated in FIG. 2. The cross section depicted in FIG. 2a is expected to exhibit greater photosensitivity than the cross section depicted in FIG. 2b.

The index modulation of the photosensitive coupling region and its sensitivity to actinic radiation are enhanced if, preceding the actinic exposure, the tapering and fusing process are done using an oxygen-hydrogen flame. In the prior art, hydrogen must first penetrate the 125 $\mu$m diameter, photoinsensitive silica cladding before diffusing into the nominally 8.5 $\mu$m diameter Ge-doped, photosensitive silica core. The present process is substantially different. First, we reduce the pressure, temperature, and time required to in-diffuse molecular hydrogen and/or deuterium into the silica by manufacturing a fiber in which the cladding of the fiber is photosensitive, thereby eliminating the large non-photosensitive barrier to indiffusion. Second, the time for the $H_2$ concentration to reach equilibrium within the center of a silica waveguide is reduced significantly by a factor $\chi$ in the tapered waist, where $\chi$ is defined as:

$$\chi = \left(\frac{d_{waist}}{d_{fiber}}\right)^2.$$

$d_{waist}$ is the diameter of the waist and $d_{fiber}$ is the original diameter of the fiber. Therefore, the time to treat the tapered coupler waist can be $10^{-4}$ times smaller than the time to treat a standard optical fiber. In the present method of fabrication based on fusing and elongating fibers, hydrogen photosensitization can be achieved automatically by using an oxygen-hydrogen torch.

OPERATION

The grating assisted mode coupler 112 redirects optical energy from a source 104 that is propagating in an optical fiber 108 which is connected to the coupler 112 through a fiber connector 114. The period of the index grating formed within the coupler is chosen to redirect only that optical energy within a particular wavelength band into another optical fiber, which travels to detector 106 rather than detector 110. All other wavelengths propagate through the coupler to detector 110, but not detector 106. This device is optimally fabricated by tapering and longitudinally fusing photosensitive cladding optical fibers or by defining the waveguide structure on a planar, doped silica substrate.

Figure 5:
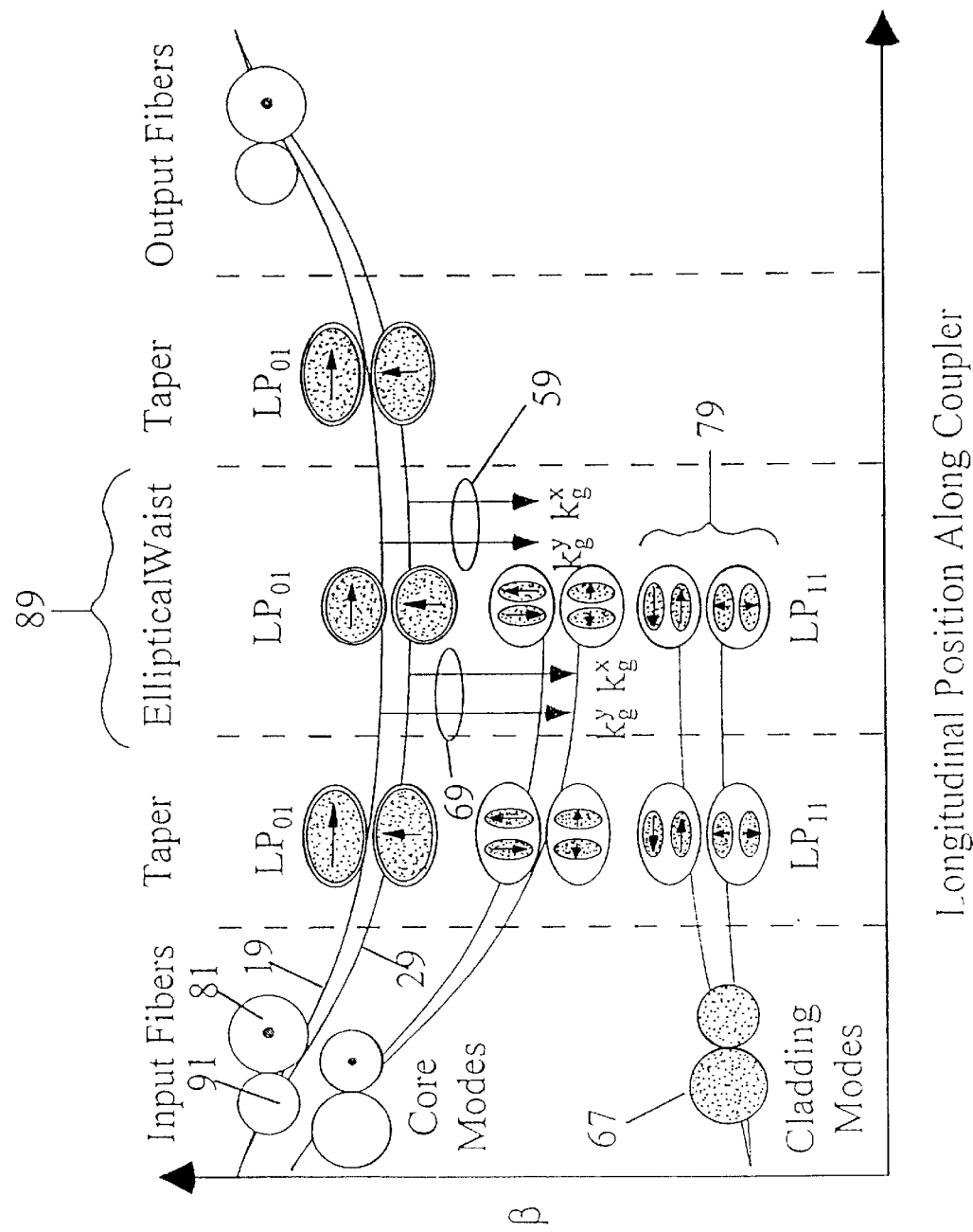
FIG. 5 shows the evolution of the optical modes through the grating assisted mode coupler with an elliptical waist based on an adiabatic approximation for sufficiently gradual taper, where the propagation constant ($\beta$) variations are not to scale.

One exemplification of this invention is a grating assisted mode coupler fabricated by fusing and elongating photosensitive fiber. The waist of this coupler can have any cross section. Elliptical and circular cross sections are preferred. The nature of this cross section influences the operating characteristics. In a first example the coupler has a waist of elliptical cross section, as illustrated in cross section in FIG. 4. FIG. 5 schematically illustrates the evolution of the optical mode through this device. In the adiabatic approximation, the variation of the propagation constant through the asymmetric coupler, in the absence of a grating, is indicated by the upper two solid curves 19, 29, corresponding to the two orthogonal polarization directions. To couple light from the first waveguide 81 to the second waveguide 91 requires a grating which reduces the propagation constant of the optical mode by a grating momentum $k_g^x$ and $k_g^y$, corresponding to the momentum mismatch between those particular $LP_{01}$ and $LP_{11}$ modes. The grating momentum $k_g$ is defined as:

$$k_g = \frac{2\pi}{\Lambda_g},$$

where $\Lambda_g$ is the grating period. The grating period is predetermined according to which modes are to be coupled. To transfer energy from a mode with propagation vector $\beta_1$ to a mode with propagation vector $\beta_2$, the desired grating period is:

$$\Lambda_g = \frac{2\pi}{|\beta_1| + |\beta_2|}.$$

The grating period is then defined during the recording stage by selecting the half angle $\theta$ and wavelength $\lambda$ of the recording beams within the cladding, according to the Bragg law:

$$\Lambda_g = \frac{\lambda}{2\sin\theta}.$$

There are two sets of grating momenta 59, 69 which achieve this transfer of energy, dependent on which of the two nearly degenerate $LP_{11}$ modes are excited. The grating should not couple light to the $LP_{11}$ modes 79 which evolve into the cladding mode 67 of the output fiber, because these modes escape from the waveguide and contribute to excess loss.

Figure 6:
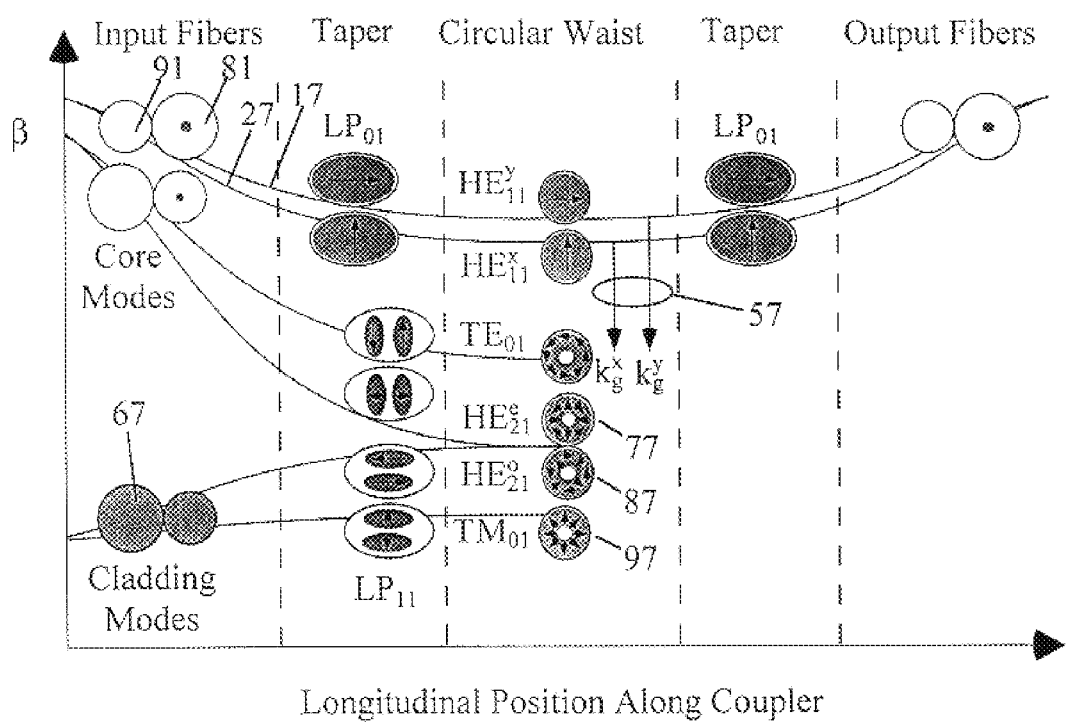
FIG. 6 shows the evolution of the optical modes through the grating assisted mode coupler with a circular waist based on an adiabatic approximation for sufficiently gradual taper, where the propagation constant ($\beta$) variations are not to scale.

In a second example the coupler has a waist of circular cross section. FIG. 6 schematically illustrates the evolution of the optical mode through an asymmetric coupler with a circular waist. In the adiabatic approximation, the variation of the propagation constant through the asymmetric coupler, in the absence of a grating, is indicated by the upper two solid curves 17, 27, corresponding to the two orthogonal polarization directions. To couple light from the first waveguide 81 to the second waveguide 91 requires a grating which changes the propagation constant of the optical mode by momenta $k_g^x$ and $k_g^y$, corresponding to the momentum mismatch between the $HE_{11}$ and $TE_{01}$ modes. A set of grating momentum 57 is required to couple the two orthogonal polarization modes at the input. Preferably, light should not couple into the $HE_{21}^e$ mode 77, because any twist of the waveguide will then result in the loss of light by coupling into the $HE_{21}^o$ mode 87, which evolves into the cladding mode 67 of the output fiber and escapes from the waveguide. Similarly, the grating should not couple light into the $HE_{21}^o$ or $TM_{01}$ 97 modes directly, for these also evolve into the cladding mode 67 of the output fiber and contribute to excess loss. In general, the cross section of the waist can take any form, and the optical modes become correspondingly more complicated.

Figure 7:
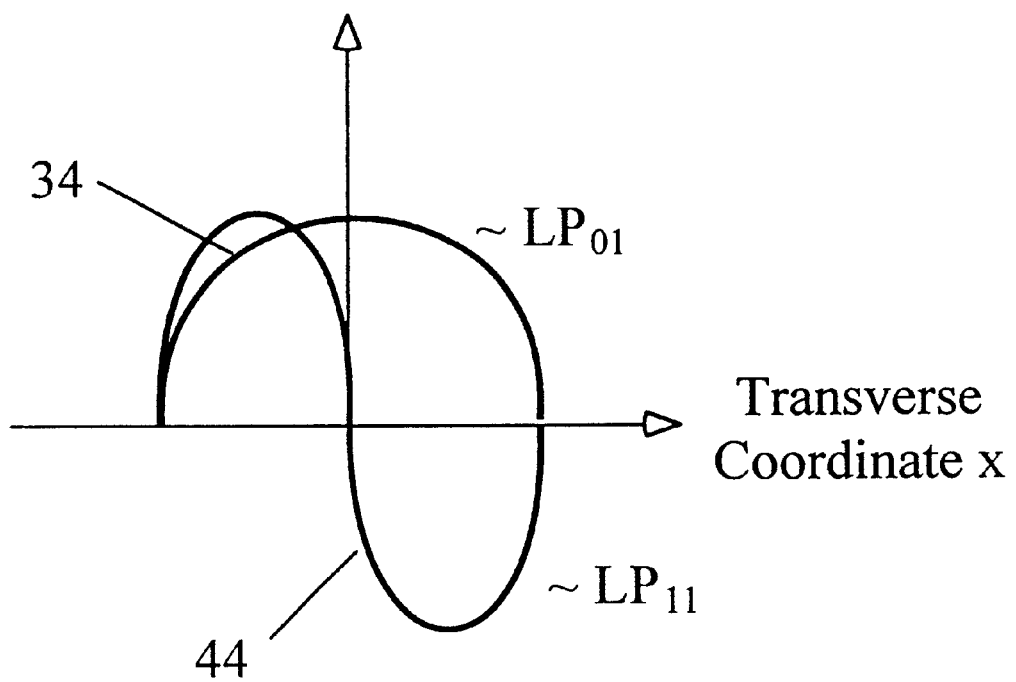
FIG. 7 shows the electric field amplitudes of the two lowest order optical modes of the tapered waist region of the grating assisted mode coupler.

FIG. 7 schematically illustrates the two lowest order optical modes 34 $LP_{01}$ and 44 $LP_{11}$ of the elliptical waist region 89 of FIG. 5. The coupling strength between two optical modes is related to an overlap integral of the two optical electric field amplitudes $E_1$, $E_2$ according to:

$$\kappa = \frac{\omega \varepsilon}{4} \int_{-\infty}^{\infty} \Delta(n^2(x,z)) E_1(x) E_2(x) dx$$

where $\Delta(n^2)$ represents an index of refraction grating in the coupler waist, supporting lowest order optical fields $E_1$ and $E_2$ corresponding to the orthogonal modes $LP_{01}$ and $LP_{11}$, respectively, in the case of a coupler waist of elliptical cross section. The integration over x corresponds to the transverse direction. While this particular form of the overlap integral for $\kappa$ strictly applies only to slab waveguides, the predictions based on this theory hold for cylindrical waveguides as well, with only slight modification. A calculation of $\kappa$ indicates that the coupling is zero unless the grating perturbation $\Delta(n^2)$ is asymmetric in the x direction, hereafter referred to as transversely asymmetric. For optical fibers rather than planar waveguides, x is the direction in the coupler waist joining the two original fiber cores. Therefore, to get a significant $\kappa$, on the order of 1 cm$^{-1}$, requires a transversely asymmetric grating. Note that this requirement on the grating is in addition to the requirement that the coupler itself be asymmetric.

The optical modes $E_1$ and $E_2$ are approximately given in the highly confined regime by:

$$E_1 \approx E_1^0 \cos\left(\frac{\pi}{2d}x\right), -d \leq x \leq d; E_1 \approx 0, |x| > d$$

$$E_2 \approx E_2^0 \sin\left(\frac{\pi}{d}x\right), -d \leq x \leq d; E_2 \approx 0, |x| > d,$$

where 2d is the transverse extent of the modes in the waist region. There are two transversely asymmetric forms of n(x,z) which lead to particularly large coupling strengths. In one device, the grating is only recorded in that part of the waveguide from 0<x<d:

$$n_1(x,z) = n_o + \Delta n_g \sin\left(\frac{2\pi}{\Lambda_g} z\right) u(x) + \Delta n_f u(x),$$

where $n_o$ is the index of the first waveguide, $\Delta n_g$ is the grating index modulation, $\Delta n_f$ is the cladding index difference of the first and second waveguides, and u(x) is the Heaviside step function, which is defined to be zero for negative x and unity for positive x. This gives a coupling strength ⅓ of the maximum possible value, which is the coupling strength of a conventional reflection grating that couples the backward and forward lowest order modes.

In another example of this invention, the normal to the grating planes is tilted slightly relative to the longitudinal axis of the waveguide so that the phase of the index grating changes by $\pi$ as x varies from –d to d:

$$n_{II}(x,z) = n_o + \Delta n_g \sin 2\pi \left(\frac{z}{\Lambda_g} + \frac{x}{2d}\right).$$

This gives a coupling strength identically equal to the maximum possible value. As an example of the required tilt, the normal to the gratings planes may be inclined by $\tan^{-1}(\Lambda_g/2d)$ degrees relative to the longitudinal axis of the waveguide. To produce a coupler with a 1.55 μm center wavelength and a 5 μm coupler waist diameter, this angle should be 5.7°. The diffraction efficiency of a reflection grating asymptotically approaches 100%, in constrast to the periodic oscillations in diffraction efficiency for a transmission grating. Therefore, a device based on reflection gratings is more robust with respect to grating decay and changes in the interaction length than an embodiment based on transmission gratings. This relaxes the manufacturing tolerances for a reflection mode grating assisted mode coupler while also improving the bandpass characteristics.

EXAMPLE 1

In accordance with one procedure, the index of refraction grating within the fused coupler is impressed by actinic illumination. The photosensitive response in the coupler waist is achieved by fusing two locally dissimilar (in composition and/or diameter) optical fibers. Referring to FIG. 8, one optical fiber has a photo-insensitive cladding 82, such as standard, single mode telecommunications optical fiber (e.g., Corning SMF 28), and the other fiber has a photosensitive cladding 62. The coupler waist is of sufficiently small diameter that the original cores 92, 72 no longer confine the mode, and the waveguiding properties are dictated primarily by the tapered cladding and the material of lower index (typically air) surrounding the coupler waist This example of the invention requires at least one segment of fiber whose cladding is at least partially photosensitive.

Figure 9A:
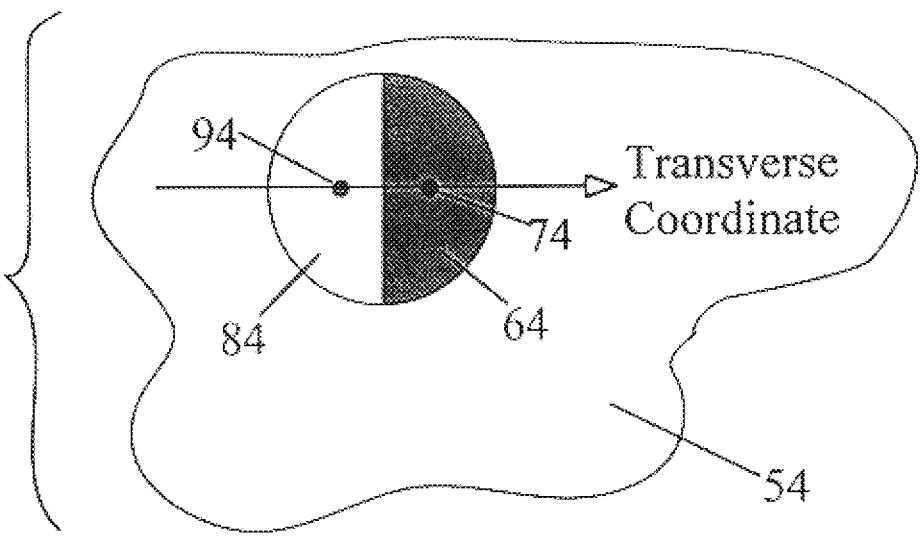
FIG. 9 shows a cross sectional view of the photosensitized grating assisted mode coupler at the waist.
Figure 9B:
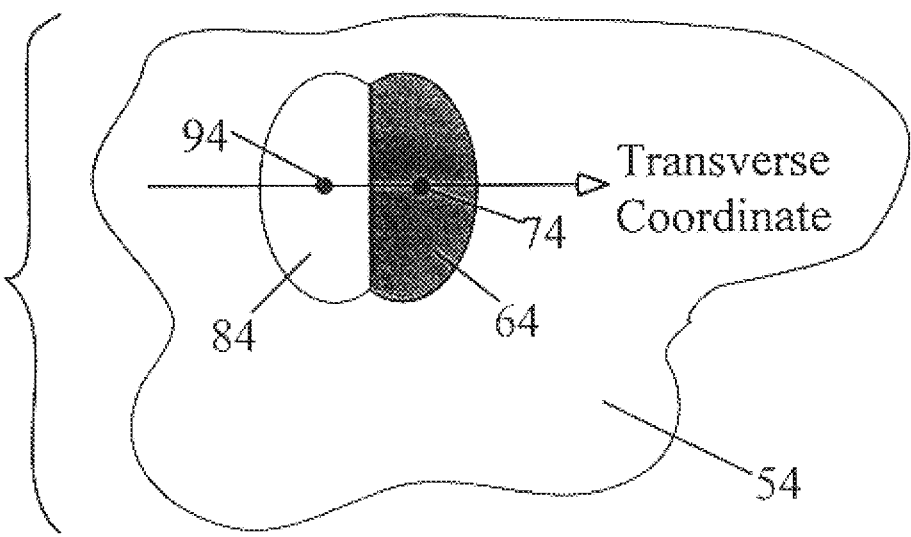

FIG. 9 illustrates the typical fused coupler waist cross sections, either elliptical (circular in the special case) (FIG. 9a) or dumbell-shaped (FIG. 9b) using photosensitive fiber of the type shown in FIG. 2. The shading represents the degree of photosensitivity, or more particularly the degree of Ge, Ge/B, Ce, or P doping in the silica host glass comprising the optical fiber. These four dopants are known to photosensitize glass to actinic radiation, and other dopants will immediately be apparent to those skilled in the art.

Figure 8A:
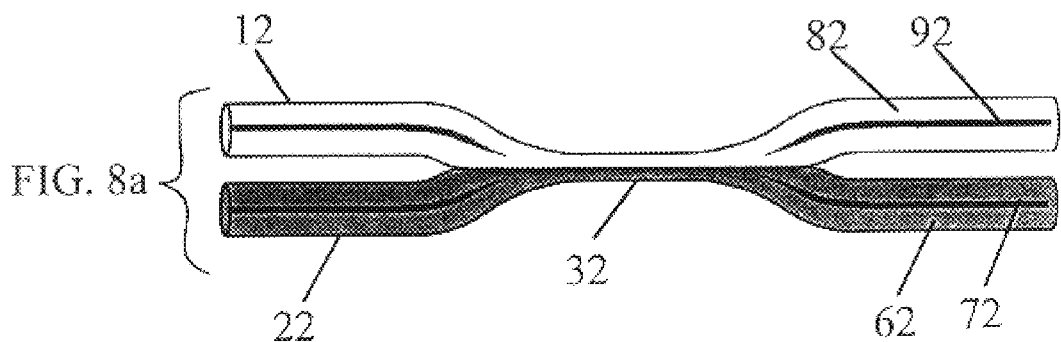
FIG. 8 shows a grating assisted mode coupler in which only part of the tapered waist is photosensitive and an index grating is recorded in that part of the waist by illumination.
Figure 8B:
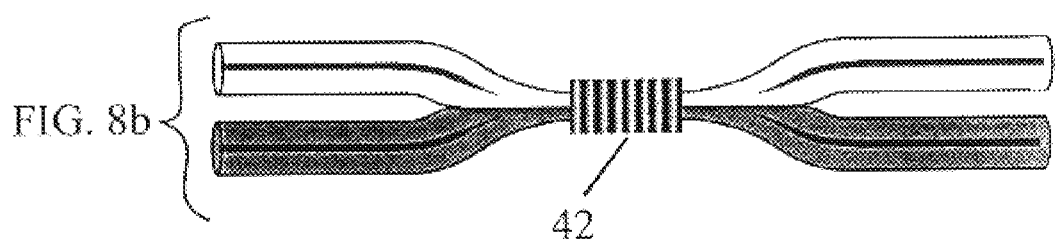
Figure 8C:
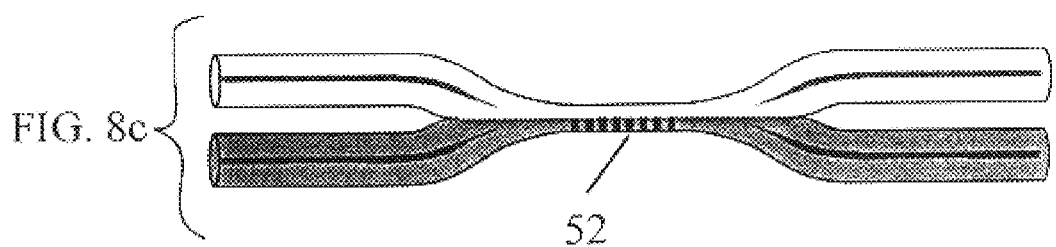

The process of recording an index of refraction grating to form a grating-assisted asymmetric coupler is illustrated in FIG. 8. An optical fiber 12, composed of a core 92 and a photo-insensitive cladding 82, is tapered and fused to an optical fiber 22, composed of a core 72 and a photosensitive cladding 62, to form a coupling region 32 (FIG. 8a). The coupling region is subjected to an interference pattern of actinic radiation 42 (FIG. 8b). The exposure records a permanent index of refraction grating in the photosensitive portion of the coupler waist 52 (FIG. 8c). The grating exhibits a transverse asymmetry because only half of the optical fiber is photosensitive. Thus the grating resides only in the photosensitive half of the coupler waist. We have determined that this transverse asymmetry is an important factor in producing a large coupling strength.

EXAMPLE 2

Figures 10A, 10B, 10C:
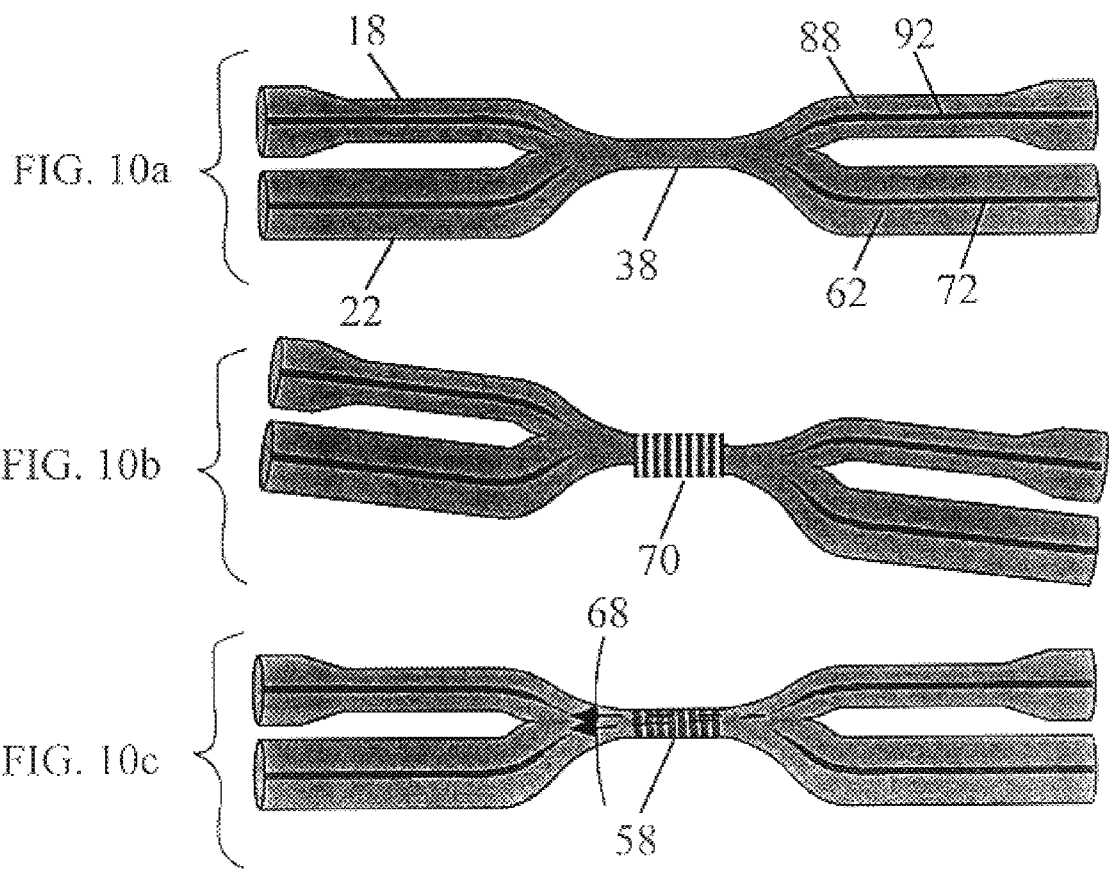
FIG. 10 shows a grating assisted mode coupler in which the entire tapered waist is photosensitive and a tilted index grating is recorded in the waist region by illumination.

In another example of the coupler structure, a transverse asymmetry in the index grating is introduced by fusing two optical fibers 18, 22 which are dissimilar in the vicinity of the coupler and whose claddings 88, 62 are both photosensitive, as in FIG. 10. By using two photosensitive cladding optical fibers, the efficiency of the grating in the coupler waist 38 will be higher. The shading of FIG. 10a represents the degree of photosensitivity, or more particularly the degree of Ge, Ge/B, Ce, or P doping in the silica host. The coupler waist is of sufficiently small diameter that the cores 92, 72 no longer confine the mode, and the waveguiding properties are dictated primarily by the tapered cladding and the material of lower index (typically air) surrounding the coupler waist 38. The coupler waist 38 is subjected to an interference pattern of actinic radiation 70 whose normal to the interference fringe planes is inclined relative to the longitudinal axis of the waveguide as an alternate means to introduce a transverse asymmetry (FIG. 10b). The exposure induces a permanent index of refraction grating in the photosensitive portion of the coupler waist 58, the grating displaying a slight angular tilt 68 (FIG. 10c).

A typical cross section at the fused coupler waist fabricated from two photosensitive cladding fibers of FIG. 2 is illustrated in FIG. 4. Depending on the degree of fusion, the waist can take the form of a dumbell (FIG. 4b) or an ellipse (FIG. 4a). At the coupler waist, the optical mode extends outside the original cores 170 and the entire waist 150 becomes the new effective core. The Ge doped claddings 160 occupy only a portion of the new waveguiding region 150. It is therefore desirable that the doped region of the optical fiber cladding extends out as far as possible in the original fiber.

EXAMPLE 3

Figure 11:
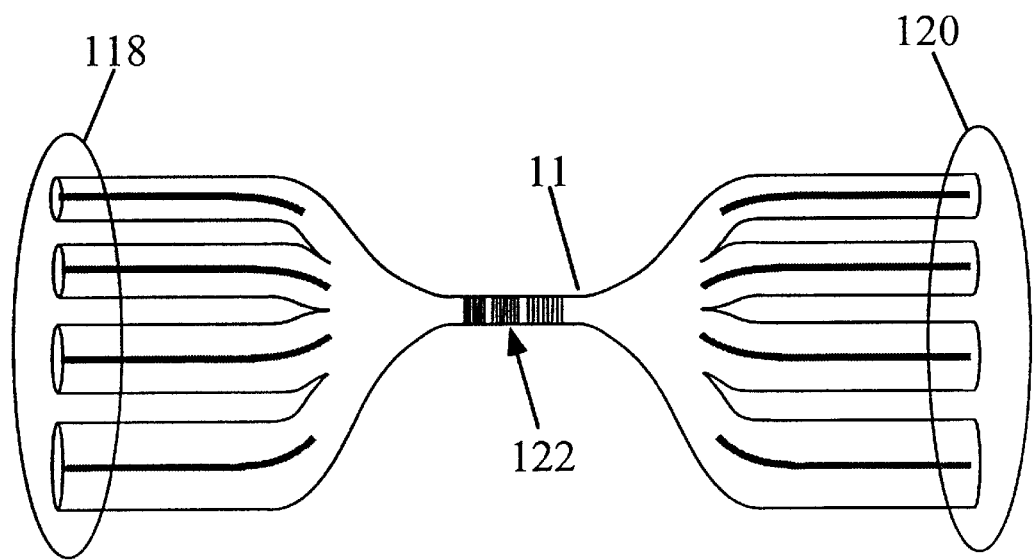
FIG. 11 shows a grating assisted mode coupler using more than two fused fibers and including a multiplicity of index gratings in waist region.

In yet another example, more than two locally dissimilar fibers are fused together to form a coupling region, as illustrated in FIG. 11. To impress a multiplicity of index of refraction gratings 122 within the coupler waist 11 using actinic illumination, at least one of the fibers of the fiber bundle 118, 120 possess a photosensitive cladding so that a grating can be recorded within the coupler. In the preferred embodiment, many of the fibers in the fiber bundle 118, 120 have photosensitive claddings.

EXAMPLE 4

Figure 12:
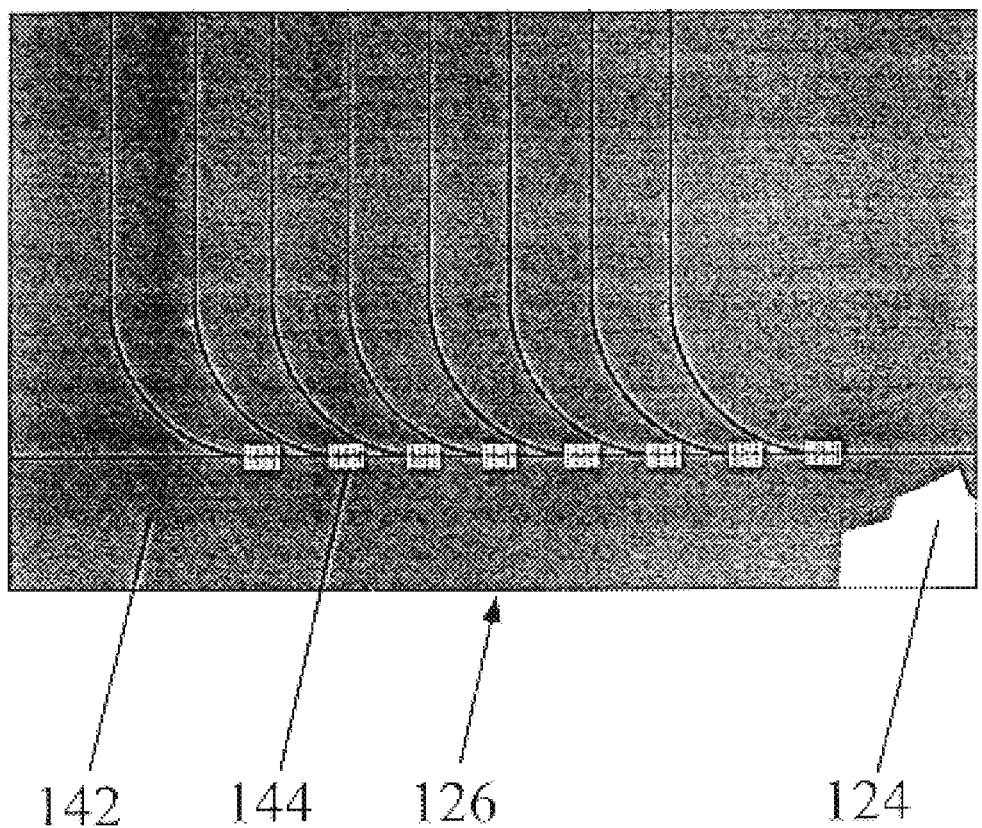
FIG. 12 shows the fabrication of a WDM eight channel demultiplexer on a planar substrate using a photoresist and chemical indiffusion, outdiffusion, or etching to form the gratings within the grating assisted mode coupler waists.

In a different variant, the index modulation of the coupling region is impressed by chemical indiffusion, outdiffusion, or etching through a patterned photoresist 142 defining the grating 144, as illustrated in FIG. 12. This particular example illustrates the patterning of the gratings for an eight channel WDM multiplexer/demultiplexer 126 implemented on a planar waveguide circuit composed of silica on silicon 124. To impress the grating, Ti or Ge is indiffused into silica or HF acid can be used to etch silica according to the resist pattern. Note that these processing steps are particularly well suited for fabricating couplers on planar substrates, which lend themselves well to the integration of several devices on the same substrate. Planar substrate devices are described in detail in J. T. Boyd, ed., Integrated Optics—Devices and Applications, IEEE Press, LEOS Progress in Lasers and Electro-Optics Series, New York (1991). In one example, silica is deposited on silicon by flame hydrolysis deposition and reactive ion etching is used to define the waveguides. Note that this same device works both as a multiplexer and demultiplexer.

EXAMPLE 5

Add/Drop Filter

Figure 13A:
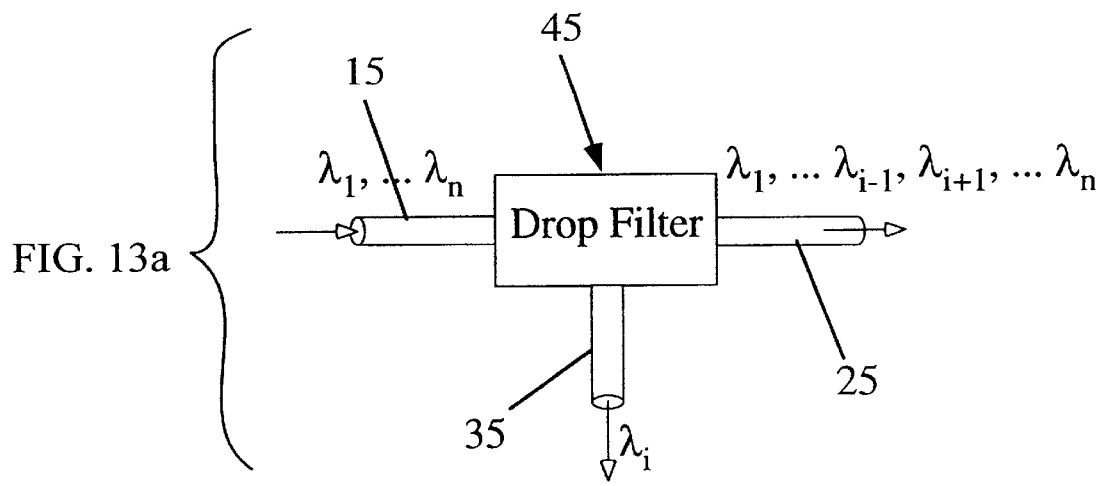
FIG. 13 shows schematically a channel add/drop filter based on a grating assisted mode coupler.
Figure 13B:
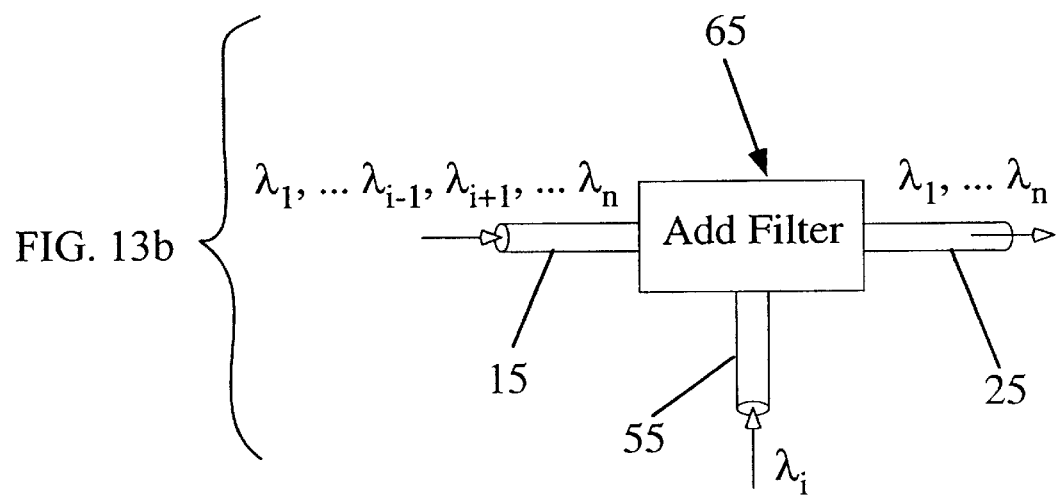

An all-fiber, zero insertion loss device to selectively add or drop an optical channel of a particular wavelength with high efficiency is a building block for WDM networks. A functional representation of this device based on a grating assisted mode coupler is illustrated in FIG. 13. The input optical fiber 15 carries n channels of information, each channel at a different center wavelength $\lambda_j$. The grating assisted coupler 45 redirects a particular channel) into the first output optical fiber 35, while all other channels travel uninterrupted through the aforementioned coupling region to the second output optical fiber 25. The identical device can also operate as an add filter by simply using the output fiber 35 as a new input fiber 55. A particular channel $\lambda_i$ is added to a fiber containing channels at other wavelengths $\lambda_j$. The add filter 65 or drop filter 35 are passive devices operating only at one or more predefined wavelengths. The drop filter 45 can simultaneously drop multiple channels by recording several gratings of predetermined periodicity within the coupling region. Similarly, the add filter 65 can simultaneously add multiple channels by recording several gratings of predetermined periodicity within the coupling region.

EXAMPLE 6

Dispersion Compensator

The standard single mode fiber which comprises the bulk of the present optical fiber network exhibits a chromatic dispersion of 17 ps $(nm-km)^{-1}$ at 1.55 $\mu$m, the center wavelength of choice for dense WDM. Light of different wavelengths in the vicinity of 1.55 $\mu$m travels at different velocities within the fiber because of group velocity dispersion. In particular, the higher frequency components associated with a modulated optical signal travel faster than the lower frequencies, which leads to pulse broadening and lower signal-to-noise ratio at the receiver.

It has been shown theoretically by S. Thibault et al., Optics Letters, Vol. 20, p. 647 (1995), that a 4.33 cm grating with a chirp of 20 GHz is optimal to compensate for the dispersion of a 100 km fiber link at 2.5 Gbit $s^{-1}$. The reduction in the bit-error-rate due to dispersion compensation arising from the chirped fiber grating corresponds to a power gain of only 3.44 dB, so a true improvement in performance is obtained only if the insertion loss is less than this power gain. In the conventional practice of the art, a chirped, in-line reflection grating requires that the backwards propagating beam be removed from the fiber with high isolation and low insertion loss. Clearly, for this device to be of practical value, the dispersion compensator should exhibit extremely low loss. This is an inherent advantage of the grating assisted mode coupler embodiment described herein.

Figure 14:
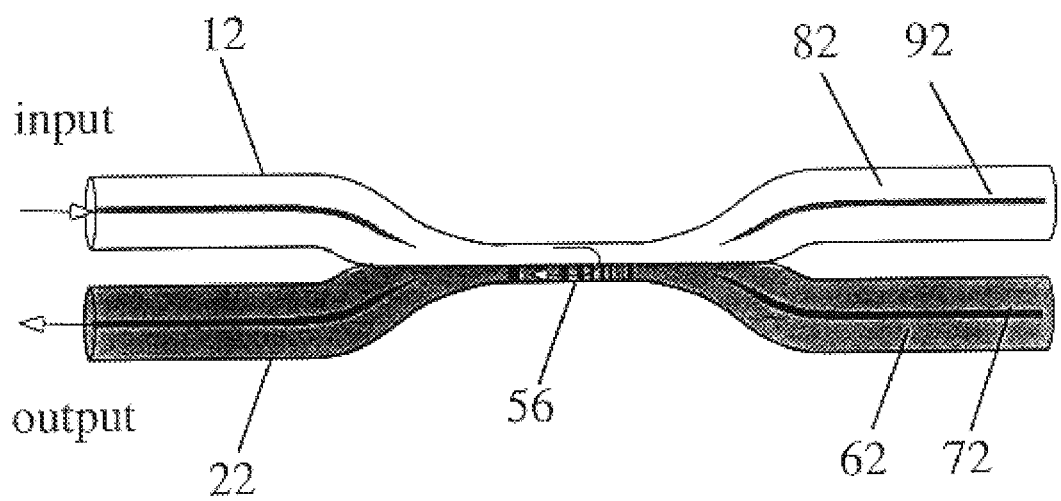
FIG. 14 shows schematically a chromatic dispersion compensator for high data rate optical communications using a chirped reflection grating in a grating assisted mode coupler.

A dispersion compensator based on a grating assisted mode coupler is illustrated in FIG. 14. Higher frequency components display a larger group velocity than lower frequency components for standard single mode fiber at 1.55 $\mu$m. Therefore, a chirped grating 56 which reflects higher frequency components of the optical pulse later than the lower frequency components displays a predetermined negative dispersion that exactly compensates the positive dispersion of a given length of standard optical fiber. For instance, if an optical beam is launched into the input fiber 12, the different temporal frequency components comprising the information envelop are reflected after traveling substantially different distances within the coupler waist and then recombine and exit the output fiber 22. The optical beam effectively experiences a negative chromatic dispersion within the device. The dispersion compensator can be located at any point along the given length of optical fiber.

The chirped grating can be formed by varying the period of the index of refraction grating along the longitudinal axis of the coupler. Alternately, a chirp can be introduced to a grating of uniform periodicity along the longitudinal axis of the coupler by bending, tapering the waveguide dimensions, biasing the background index of refraction, and/or non-uniformly heating the coupler waist to generate the desired wavelength response.

EXAMPLE 7

Wavelength Dependent Loss Element

A wavelength dependent loss element is essential in an optical fiber link using WDM. For example, this device can be used to flatten the gain spectrum of an Er doped fiber amplifier in the spectral region around 1.55 μm. In the conventional practice of the art this is achieved by introducing a chirped reflection grating containing a multiplicity of grating periodicities, predetermined to generate the desired wavelength dependent reflectivity. This device has the drawback that the undesired power is coupled to backward propagating modes within the fiber, rather than coupled out of the fiber. This results in undesired optical feedback within the lightwave circuit In accordance with EXAMPLES 1 and 2 of this invention, it is apparent that a grating assisted mode coupler can efficiently and reliably dump the undesired illumination into another fiber. In this example, a predetermined multiplicity of grating periods are impressed within the coupling region to generate the desired wavelength dependent loss either at the throughput port or the drop port.

EXAMPLE 8

WDM Demultiplexer/Multiplexer

Figure 15:
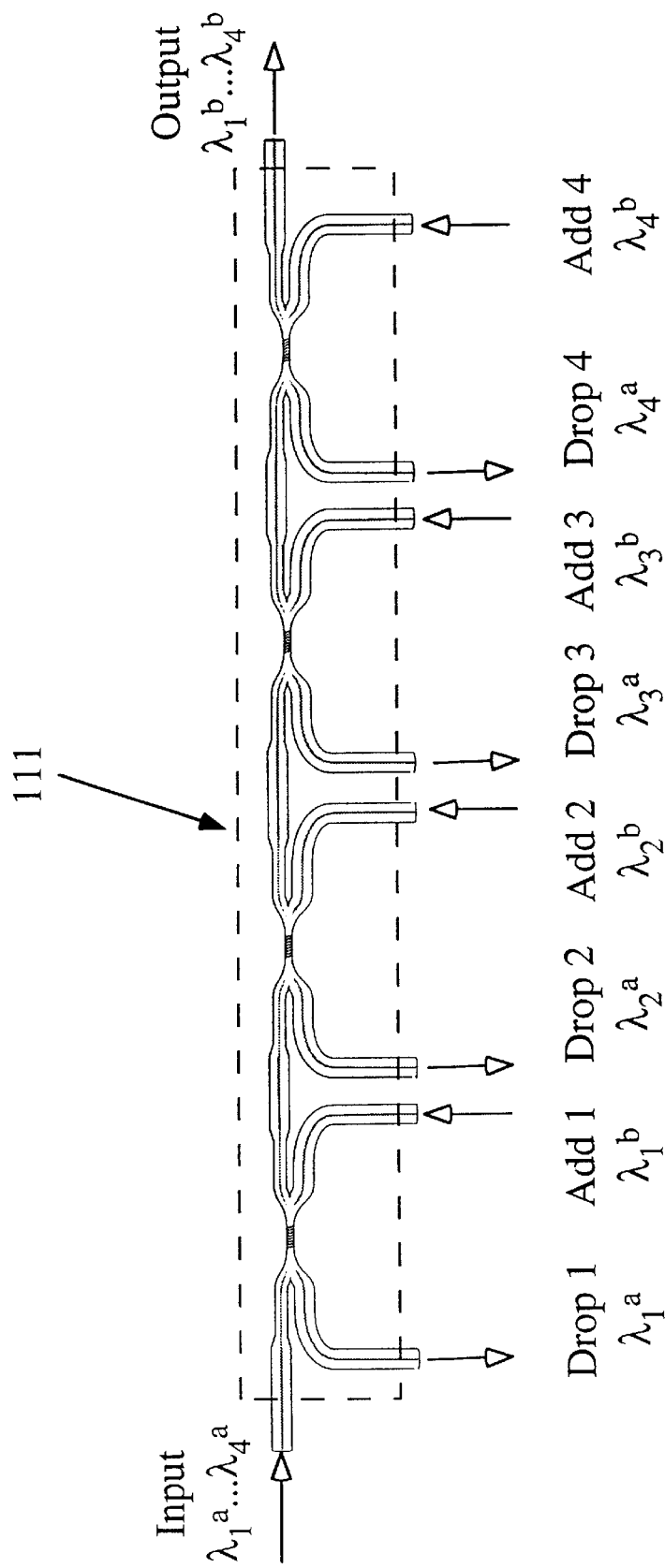
FIG. 15 shows a WDM four channel demultiplexer based on four grating assisted mode couplers in series.
Figure 16:
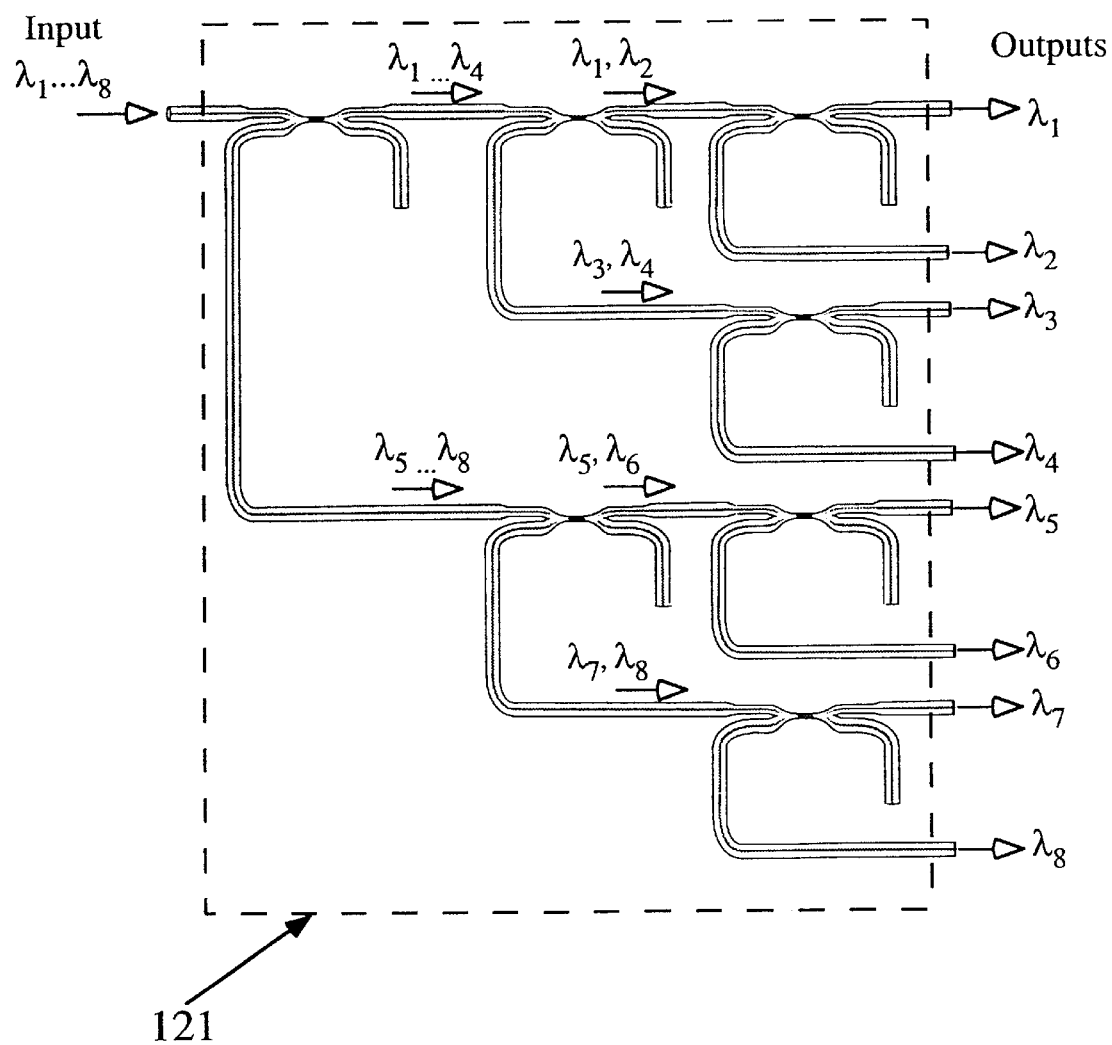
FIG. 16 shows a WDM eight channel demultiplexer based on seven grating assisted mode couples in a heirarchical arrangement.

A device to multiplex/demultiplex several wavelength channels traveling along the same waveguide can be implemented by joining several grating assisted mode couplers in series. FIG. 15 illustrates four all-fiber based add/drop filters joined in series to form a five channel WDM multiplexer/demultiplexer. FIG. 16 illustrates seven add/drop filters joined in a heirarchical tree structure to form an eight channel WDM demultiplexer. The heirarchical tree arrangement minimizes the number of individual add/drop filters each wavelength channel passes through to $\log_2 N$, where N is the number of wavelength channels to be multiplexed. This minimizes the total insertion loss of the demultiplexer to the insertion loss of an individual add/drop times $\log_2 N$, rather than N-1 times the loss as is the case for the series combination. The typical insertion loss per component is 0.2 dB, so a 32 channel demultiplexer would have a total loss approximately equal to 1 dB.

Figure 17:
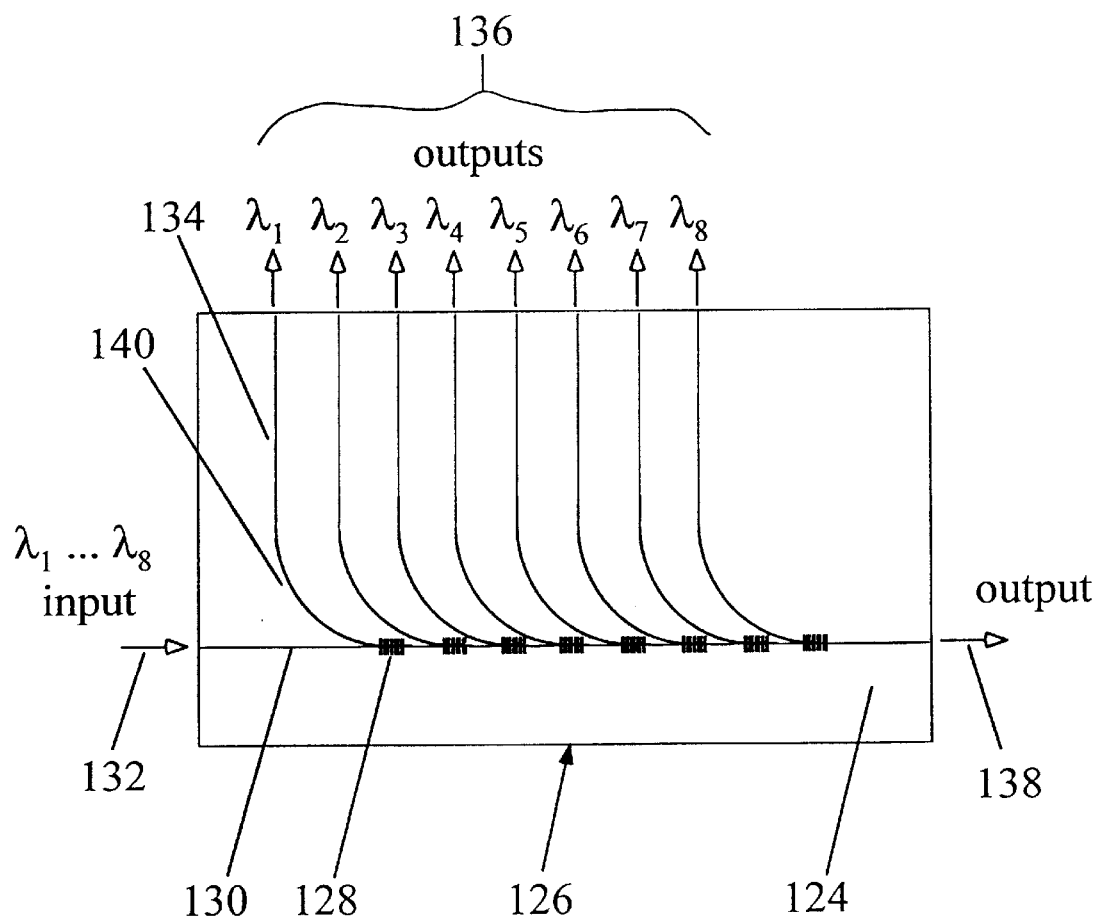
FIG. 17 shows a WDM eight channel demultiplexer based on grating assisted mode couplers fabricated on a planar substrate.

Additionally, a planar waveguide circuit is particularly well suited for multiplexing a large number of channels at a single location and integrating a large number of couplers in a small area. FIG. 17 shows an eight channel WDM demultiplexer 126 using eight drop filters in series, each filter dropping a particular wavelength. Other spatial configurations of the grating assisted mode coupler elements will be immediately apparent to one skilled in the art. The asymmetric couplers can be defined by lithography on a silica-on-silicon planar waveguide circuit 124, for example. The gratings can be impressed by actinic illumination or chemical indiffusion, outdiffusion, or etching. The input signal containing a multiplicity of wavelength channels 132 travels down the input waveguide. Light of a particular wavelength is reflected into a particular dissimilar waveguide 140 according the periodicity of the grating 128. The dissimilar waveguide 140 is adiabatically tapered to evolve into an output waveguide segment 134 whose propagation constant is identical to that of the input waveguide 132. Light at wavelengths other than those to be demultiplexed exit the planar waveguide circuit at the output 138.

EXAMPLE 9

Add/Drop Fabrication #1

Figure 18:
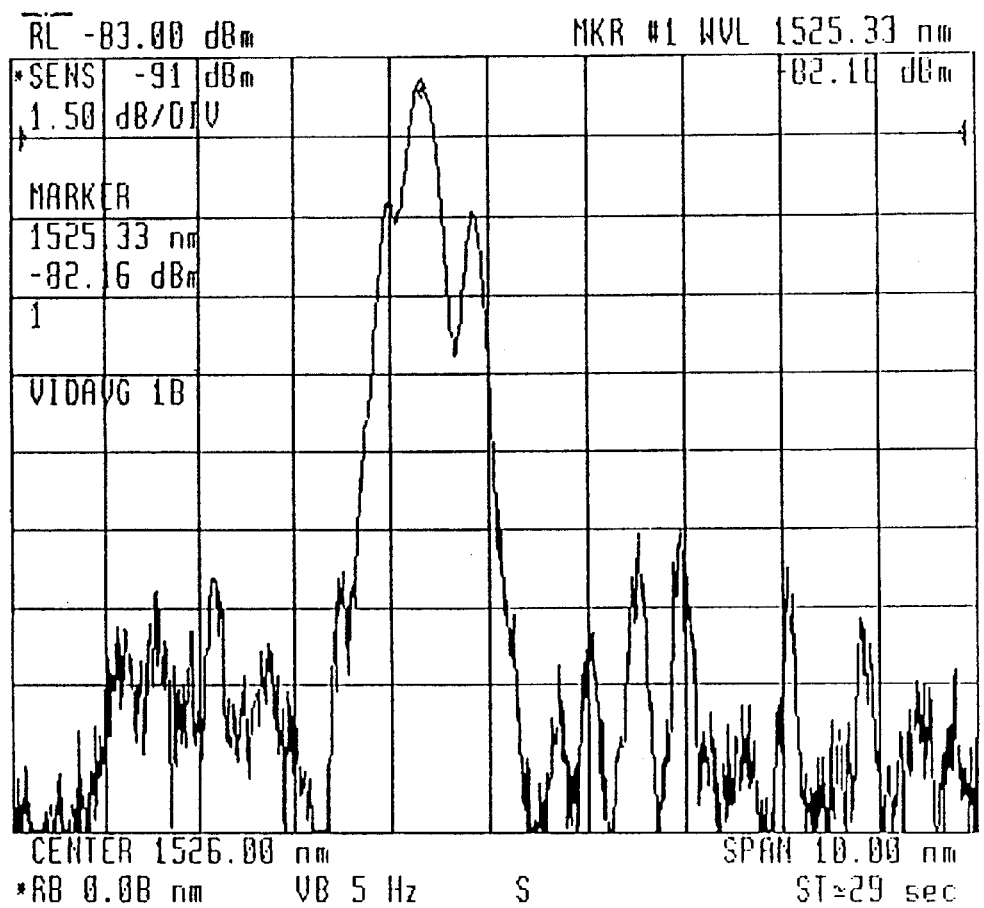
FIG. 18 shows wavelength characteristics at drop port of prototype.

One optical fiber whose index profile is illustrated in FIG. 2b, where the doped portion of the cladding 200 extends out to a diameter of 40 μm and the core 180 is 8 μm, is pretapered such that the diameter is reduced from 125 μm to 95 μm over a length of approximately 5 mm. The pretapering is accomplished by pulling on opposite ends of the optical fiber while heating the optical fiber with an oxygen-hydrogen torch. A second untapered optical fiber with the same index profile as in FIG. 2b is then placed longitudinally adjacent to the first fiber. The two fibers are subsequently fused and elongated by pulling on opposite ends of the optical fibers while heating with the same oxygen-hydrogen torch. The pulling ceases when the diameter of the fused waist is 5 μm. The coupler waist is immediately exposed to a UV interference pattern generated by illuminating a silica phase mask of period 1.06 μm with a beam of 248 nm illumination. This produces an optical interference pattern with a period of 0.5 μm. The energy per pulse of the illumination is 130 mJ, the pulse duration is 10 ns and the repetition rate is 20 Hz. The grating is recorded for 20 seconds. The fused region of the fiber is subsequently bonded to a silica half-tube to provide mechanical strength. The wavelength trace of light backwards coupled into the drop fiber is illustrated in FIG. 18. The center wavelength of the backwards coupled light is 1520 nm, and the full width half maximum of the reflectivity peak is approximately 1 nm. The separation of the backreflected wavelength from the backwards coupled wavelength is 15 nm.

EXAMPLE 10

Add/Drop Fabrication #2

The fused coupler can be fabricated using the same steps as in EXAMPLE 9, except that the pretaper of the first fiber is introduced by etching the cladding with nominally 40% HF acid in the central region of the fiber where subsequent fusion and elongation to a second fiber takes place. The etch rate is typically 3 μm per minute, and the etching process takes approximately 10 minutes.

EXAMPLE 11

High-Rejection Add/Drop Filter

Figure 19:
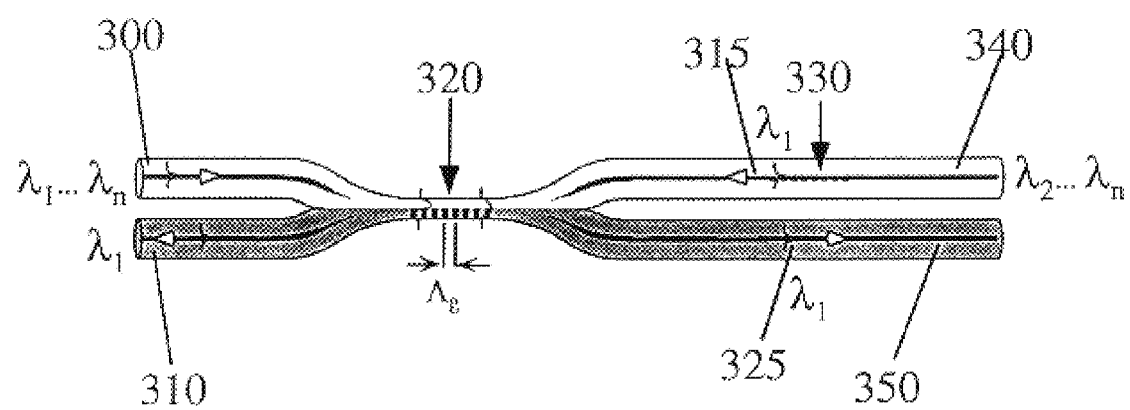
FIG. 19 shows a high rejection grating assisted mode coupler.

Rejection is a performance parameter of an add/drop filter that describes how completely the optical energy at a particular wavelength is removed from the throughput port. High rejection of a particular wavelength at a particular output port means that very little optical energy at that particular wavelength is present at that output port. WDM systems require high rejection add/drop filters. FIG. 19 illustrates a high rejection, all fiber add/drop filter. A first grating of period $\Lambda_{g1}$ 320 is recorded in the coupler waist as in EXAMPLE 5 to backwards couple a particular wavelength into the drop output port 310. A second grating of period $\Lambda_{g2}$ 330 is recorded in the throughput fiber 340 to backreflect that same wavelength 315. This second grating removes any residual signal at the drop wavelength and redirects it to the dump port 350 by reflection off the first grating 320. Rejections greater than −50 dB are possible by this method.

EXAMPLE 12

Destructive Interference of Undesired Back-Reflections

Figure 20A:
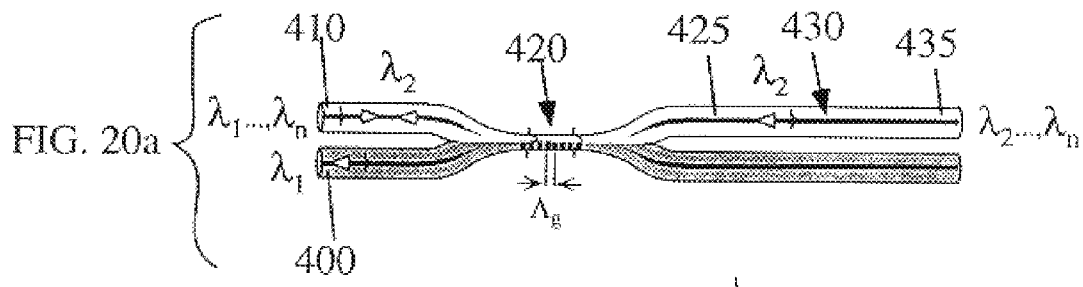
FIG. 20 shows a grating assisted mode coupler in which a second grating has been impressed to remove undesired reflections.
Figure 20B:
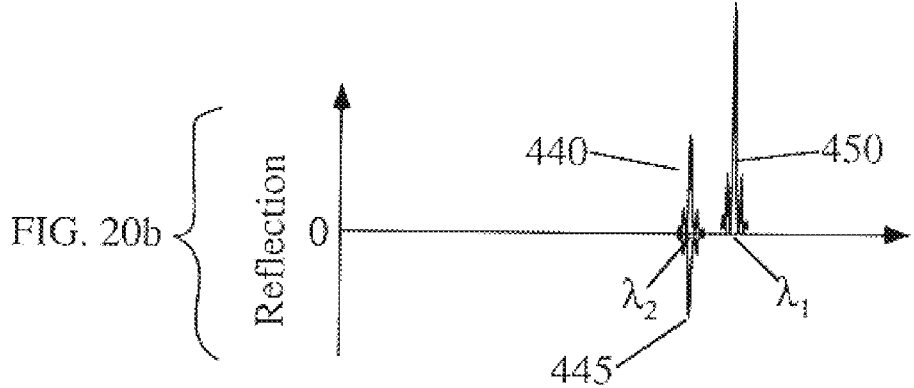
Figure 20C:
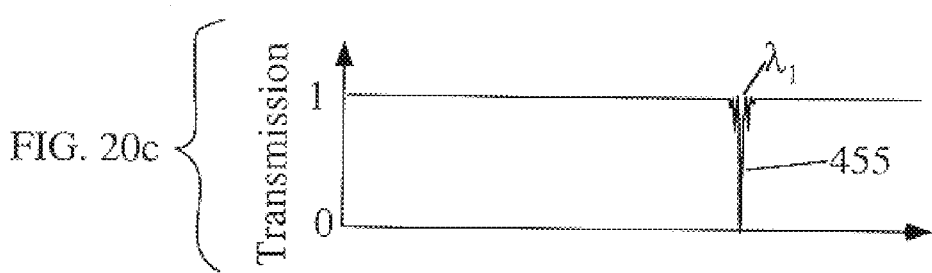

As in EXAMPLE 11, an additional grating 430 can be recorded in the throughput optical fiber 435 to reflect light entering the input port 410 at a wavelength $\lambda_2$ 445 equal to the wavelength of an undesired backreflection 440 (FIG. 20). To adjust the optical phase of this backreflected signal 445 such that it destructively interferes with the backreflection 440 from the grating 420 impressed in the coupler waist, a region 425 of the throughput optical fiber between the two gratings is uniformly exposed to change the background index of refraction within the optical fiber until the two backreflected waves interfere destructively. This technique is effective to remove undesirable backreflections weaker than 50%. This results in a clean transmission spectra (light at output port 435 divided by light power at input 410) with only a single drop channel (at wavelength $\lambda_1$) 455 exiting drop port 400 in the spectral range of interest.

EXAMPLE 13

Spectral Cleanup Filters

In WDM optical fiber links consisting of a cascade of EDFA's, spontaneous emission noise from the first few amplifers grows as it passes through subsequent amplifier stages, leading to an undesirable increase in background noise. This background noise is called amplified spontaneous emission. A spectral cleanup filter which routes only the desired wavelengths to the drop port, while dumping all other wavelengths to the throughput port, provides a means of reducing noise. In this example, a predetermined multiplicity of grating periods are impressed within the coupling region to generate the desired drop channel wavelength characteristics. A spectral cleanup filter for 8 WDM channels would consist of the standard add/drop filter but with 8 gratings of predetermined periodicity impressed within the coupler waist These gratings can be recorded either at the same or at separate locations. The grating period and grating strength would be chosen to route only the desired wavelengths to the drop port with a predetermined drop efficiency. This device can act simultaneously as a gain flattening filter by selecting the drop efficiency of each wavelength channel to compensate for the wavelength dependence of the EDFA gain profile.

EXAMPLE 14

Bidirectional Splitters

Two channel WDM facilitates bidirectional communications for applications such cable TV and telephony. For instance, the forward going signal may be a modulated optical carrier at $\lambda_1$, and the backward going signal may be a modulated optical carrier at $\lambda_2$. To split the forward and backward going signals, an add/drop filter at either $\lambda_1$ or $\lambda_2$ is used. If the splitter drops $\lambda_1$, then the forward going signal is routed to the drop port and the backward going signal exits unchanged from the original fiber- If the splitter drops $\lambda_2$, then the backward going signal is routed to the drop port and the forward going signal exits unchanged from the original fiber.

EXAMPLE 15

Tapered Fiber Grating Filters

While the grating assisted mode coupler may be fabricated by elongating and fusing two or more fibers in a central region, important devices can also be fabricated by elongating individual fibers instead. While the grating assisted mode coupler is a three or more-port device, this tapered fiber grating is a two-port device. Bragg gratings recorded in air-clad waveguides such as those formed in tapered fiber waists exhibit several performance advantages that make these devices attractive as WDM in-line filters for those cases in which the routing capability of a grating assisted mode coupler is not needed. The first advantage is that the process of elongating a fiber under an oxygen-hydrogen torch enhances the photosensitivity of the fiber waist, resulting in stronger gratings and lower exposures. A second advantage results from the large numerical aperture or strong light confinement of the air-clad glass waveguide structure, which diminishes the amount of optical energy coupled into lossy cladding and radiation modes by the grating. The multimode nature of the waveguide in the waist region further allows gratings to be defined which couple light between different optical modes.

CONCLUSIONS

It should now be appreciated that the present invention and all of its exemplifications provide a wavelength selective optical coupler displaying a variety of advantages. Firstly, an asymmetric coupling region impressed with a transversely asymmetric index grating results in a large coupling constant κ. The coupling is inherently larger than the evanescent coupling of grating assisted directional couplers, which achieve smaller overlap integrals, since the waveguides in the coupling region are not merged into a single waveguide. Secondly, by fabricating these devices using fused fibers drawn down to extremely narrow coupler waist diameters, the wavelength separation between back-reflected and backcoupled light is maximized and because of the transverse aymmetry of the grating, the strength of the backreflection is minimized. Thirdly, by operating in the reflection mode, these devices are robust under slight changes in the index modulation over time, an advantage over transmission devices prevalent in the art. Fourthly, the all-fiber, all-glass example is environmentally stable and low loss. More conventional devices such as D-core fiber couplers require bonding the coupling region together using epoxies, for instance, which are susceptible to environmental degradation. Fifthly, the grating assisted mode coupler exhibits high wavelength stability because its all-silica fabrication is inherently temperature stable. Sixthly, the reduction of the diameter of the coupler at the waist and the use of an hydrogen flame to provide heat dramatically enhance the rate and amount of hydrogen indiffusion, thereby enhancing the photosensitivity and index change of the coupler waist under actinic illumination.

The wavelength selective optical fiber devices disclosed herein have a variety of applications. In one application, a coupler is used to add or drop optical signals for communication via a common transmission path. In another application, a device is used to compensate for the chromatic dispersion in standard optical fibers at 1.55 $\mu$m. In another application, a device introduces a wavelength dependent loss for flattening the gain of an Er-doped fiber amplifier. In another application, a number of couplers are used to multiplex/demultiplex several wavelength channels onto or from a single waveguide with low loss. In another application, the device is used as a spectral cleanup filter. A person understanding this invention may now conceive of alternative structures and embodiments or variations of the above. All of those which fall within the scope of the claims appended hereto are considered to be part of the present invention.

We claim:

1. A method of enhancing the performance of a fused, grating assisted mode coupler having a coupling region comprising the steps of:

forming a coupler having a coupling region with a cross-sectional dimension of 20 microns or less, the coupler having substantial photosensitivity enhancing dopant throughout the cross-sectional area in the coupling region;

enhancing the photosensitivity of the coupler at least in the coupling region by indiffusion of a gas into the cross-sectional area of the coupler to a level such that an actinic illumination exposure to <1kJ/cm$^2$ impresses an index of refraction change >10$^{-5}$ within the coupling region; and writing the grating in the photosensitivity enhanced coupling region of the coupler with actinic illumination.

2. The method set forth in claim 1 above wherein the step of enhancing the photosensitivity comprises fusing the coupler at least in part with a hydrogen flame.

3. The method of claim 1 wherein the step of enhancing the photosensitivity comprises subjecting the coupler waist region to chemical indiffusion.

4. The method of claim 3 above wherein the chemical indiffusion includes the use of $H_2$ or $D_2$ gas.

5. The method of claim 1 wherein the step of enhancing the photosensitivity includes chemical outdiffusion.

6. A method of fabricating a fused, grating assisted mode coupler from at least two optical fibers comprising the steps of:

providing at least two optical fibers at least one of which has a photosensitive dopant distributed throughout the cladding thereof;

forming a coupler by longitudinally merging the at least two fibers by elongating and fusing the fibers to form a coupling region in which the cross-sectional dimension is sufficiently small that the doped cladding alone supports optical wave propagation in the at least one photsensitized fiber;

further enhancing the photosensitivity of the coupler in the distributed dopant region by gas indiffusion to a level such that an actinic illumination exposure to <1kJ/cm$^2$ impresses an index of refraction change >10$^{-5}$ the photosensitive region; and writing the grating in the coupler in the photosensitivity enhanced region of the coupler with actinic illumination.

7. A method for photosensitizing an optical fiber having a core and cladding by (a) drawing down an optical fiber with photosensitive cladding to a narrow waist in which the core is vestigial and the cladding alone confines optical energy, (b) exposing said narrow waist to a photosensitizing gas selected from the group consisting of $H_2$ and $D_2$, (c) maintaining the exposure for a time sufficient for said photosensitizing gas to permeate the said photosensitive cladding at the location of the said narrow waist, such that actinic illumination exposure of <1kJ/cm$^2$ impresses an index of refraction change >10$^{-5}$ and (d) impressing an index of refraction grating in said narrow waist by said actinic illumination.

8. A method for photosensitizing a fused optical fiber coupler by (a) drawing down a multitude of optical fibers, at least one of which possesses photosensitizable cladding to a narrow coupler waist in which the fibers are fused along a length;

(b) exposing the material originally comprising said photosensitizable claddings within said narrow coupler waist to a photosensitizing gas selected from the group consisting of $H_2$ and $D_2$, and (c) maintaining the exposure to the gas for a time sufficient for said photosensitizing gas to permeate said narrow coupler waist, such that actinic illumination exposure of <1kJ/cm$^2$ impresses an index of refraction change >10$^{-5}$ in the photosensitive portion of the waist.

9. A method for writing a strong grating in a fused, grating assisted mode coupler for optical waves, the mode coupler having a coupling region comprising two fused fibers, and the method comprising the steps of:

forming two optical fibers having photosensitivity enhancing dopant extending substantially throughout the cladding in at least a coupling region; concurrently elongating and fusing the fibers to form a fused coupling region;

continuing drawing the fused fibers down to a cross-sectional dimension of less than 20 microns to establish a coupling region of essentially doped cladding with only a vestigial core, for receiving an index of refraction grating in the cladding, and exposing the coupling region to actinic illumination in a periodic pattern to write an index of refraction grating in the cladding.

10. The method as set forth in claim 9 above, wherein the dopant includes germanium, and finer including the steps of exposing the coupling region of both the fibers to a laser beam from a laser of about 100 mJ or more power for about 10 minutes, to write the periodic pattern in the cladding of both the fibers.

* * * * *